US009282098B1

(12) United States Patent
Hitchcock et al.

(10) Patent No.: US 9,282,098 B1
(45) Date of Patent: Mar. 8, 2016

(54) PROXY SERVER-BASED NETWORK SITE ACCOUNT MANAGEMENT

(71) Applicant: Amazon Technologies, Inc., Reno, NV (US)

(72) Inventors: Daniel Wade Hitchcock, Bothell, WA (US); Brad Lee Campbell, Seattle, WA (US); Bharath Kumar Bhimanaik, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 13/792,678

(22) Filed: Mar. 11, 2013

(51) Int. Cl.
*H04L 29/06* (2006.01)

(52) U.S. Cl.
CPC .................................. *H04L 63/0884* (2013.01)

(58) Field of Classification Search
None
See application file for complete search history.

(56) References Cited

U.S. PATENT DOCUMENTS

| | | | | |
|---|---|---|---|---|
| 7,177,848 | B2* | 2/2007 | Hogan et al. ..................... 705/67 |
| 7,631,346 | B2* | 12/2009 | Hinton ................ H04L 63/0815 |
| | | | | 380/279 |
| 7,793,343 | B2* | 9/2010 | Timmerman ....................... 726/8 |
| 8,087,068 | B1* | 12/2011 | Downey ................ H04L 63/083 |
| | | | | 726/4 |
| 8,607,322 | B2* | 12/2013 | Hinton et al. .................... 726/10 |
| 8,745,711 | B2* | 6/2014 | Matsuda ............... G06F 21/335 |
| | | | | 726/6 |
| 8,751,794 | B2* | 6/2014 | Haulund ......................... 713/159 |
| 2002/0108057 | A1* | 8/2002 | Zhanhong Wu .... H04L 63/0428 |
| | | | | 726/6 |
| 2006/0123472 | A1* | 6/2006 | Schmidt .................. G06F 21/41 |
| | | | | 726/8 |
| 2007/0027715 | A1* | 2/2007 | Gropper ................ G06F 19/322 |
| | | | | 705/2 |
| 2008/0031447 | A1* | 2/2008 | Geshwind et al. ................ 380/46 |
| 2009/0144546 | A1* | 6/2009 | Jancula et al. ................. 713/168 |
| 2009/0300196 | A1* | 12/2009 | Haghpassand .......... G06F 21/50 |
| | | | | 709/229 |
| 2010/0146609 | A1* | 6/2010 | Bartlett .................. G06Q 20/02 |
| | | | | 726/7 |
| 2011/0162052 | A1* | 6/2011 | Hayward ................ G06F 21/41 |
| | | | | 726/5 |
| 2013/0167196 | A1* | 6/2013 | Spencer .................. H04W 8/22 |
| | | | | 726/3 |
| 2014/0259130 | A1* | 9/2014 | Li ........................... G06F 21/31 |
| | | | | 726/6 |

FOREIGN PATENT DOCUMENTS

WO 2013170374 11/2013

OTHER PUBLICATIONS

Neuman, B. Clifford. Proxy-Based Authorization and Accounting for Distributed Systems. Proceedings, the 13th International Conference on Distributed Computing Systems. Pub. Date: 1993. Relevant pp. 283-291. http://ieeexplore.ieee.org/stamp/stamp.jsp?tp=&arnumber=287698.*

Canfora, G.; Di Santo, G.; Venturi, G.; Zimeo, E.; Zito, M.V. Proxy-based Hand-off of Web Sessions for User Mobility. The Second Annual Conference on MobiQuitous, 2005. Pub. Date: 2005. Relevant pp. 363-372. http://ieeexplore.ieee.org/stamp/stamp.jsp?tp=&arnumber=1541016.*

(Continued)

*Primary Examiner* — Jeremiah Avery

(74) *Attorney, Agent, or Firm* — Thomas Horstemeyer, LLP

(57) ABSTRACT

Disclosed are various embodiments for network site account management using a proxy server. A first request for a secured resource on a network site is received from a client. It is determined whether stored account information is available for the secured resource. A second request for the secured resource is generated based at least in part on the stored account information in response to determining that the stored account information is available for the secured resource. The second request is sent to a server corresponding to the network site. The secured resource is received from the server, and the secured resource is sent to the client.

23 Claims, 13 Drawing Sheets

(56) References Cited

OTHER PUBLICATIONS

Oppliger, Rolf; Rytz, Ruedi; Thomas Holderegger. Internet Banking: Client-Side Attacks and Protection Mechanisms. Computer, vol. 42, Issue: 6. Pub. Date: Aug. 2009. Relevant pp. 27-33. http://ieeexplore.ieee.org/stamp/stamp.jsp?tp=&arnumber=5199590.*

Watt, John; Sinnott, Richard O.; Inman, George; Chadwick, David. Federated Authentication and Authorisation in the Social Science Domain. 2011 Sixth International Conference on Availability, Reliability and Security (ARES). Relevant pp. 541-548. http://ieeexplore.ieee.org/stamp/stamp.jsp?tp=&arnumber=6045974&tag=1.*

Diaz-Sanchez, Daniel; Almenarez, Florina; Marin, Andres; Arias, Patricia; Sanchez-Guerrero, Rosa; Sanvido, Fabio. A Privacy Aware Media Gateway for Connecting Private Multimedia Clouds to Limited Devices. 2011 4th Joint IFIP Wireless and Mobile Networking Conference (WMNC). http://ieeexplore.ieee.org/stamp/stamp.jsp?tp=&arnumber=6097259.*

U.S. Patent Application entitled "Managing Security Credentials" filed Jul. 29, 2011, having U.S. Appl. No. 13/194,287.

U.S. Patent Application entitled "Account Management for Multiple Network Sites" filed Feb. 1, 2012, having U.S. Appl. No. 13/363,654.

U.S. Patent Application entitled "Authentication Management Services" filed on Feb. 1, 2012, having U.S. Appl. No. 13/363,664.

U.S. Patent Application entitled "Presenting Managed Security Credentials to Network Sites" filed Feb. 1, 2012, having U.S. Appl. No. 13/363,675.

U.S. Patent Application entitled "Recovery of Managed Security Credentials" filed Feb. 1, 2012, having U.S. Appl. No. 13/363,681.

U.S. Patent Application entitled "Logout From Multiple Network Sites" filed Feb. 1, 2012, having U.S. Appl. No. 13/363,685.

U.S. Patent Application entitled "Mapping Stored Client Data to Requested Data Using Metadata" filed Nov. 16, 2012, having U.S. Appl. No. 13/679,254.

U.S. Patent Application entitled "Authentication Manager" filed Aug. 12, 2009, having U.S. Appl. No. 12/539,886.

\* cited by examiner

PROXY SERVER-BASED NETWORK SITE ACCOUNT MANAGEMENT

BACKGROUND

Many web sites require users to log in with a username and password so that the users may be securely identified. Users, however, often forget their username and/or password that are required to log in to a web site. It is also common for users to use the same username and/or password for multiple web sites. Managing tens or even hundreds of usernames and passwords is a major cause of pain for users and results in excessive abandonment rates where users simply fail to sign up for a new service if it requires a new account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
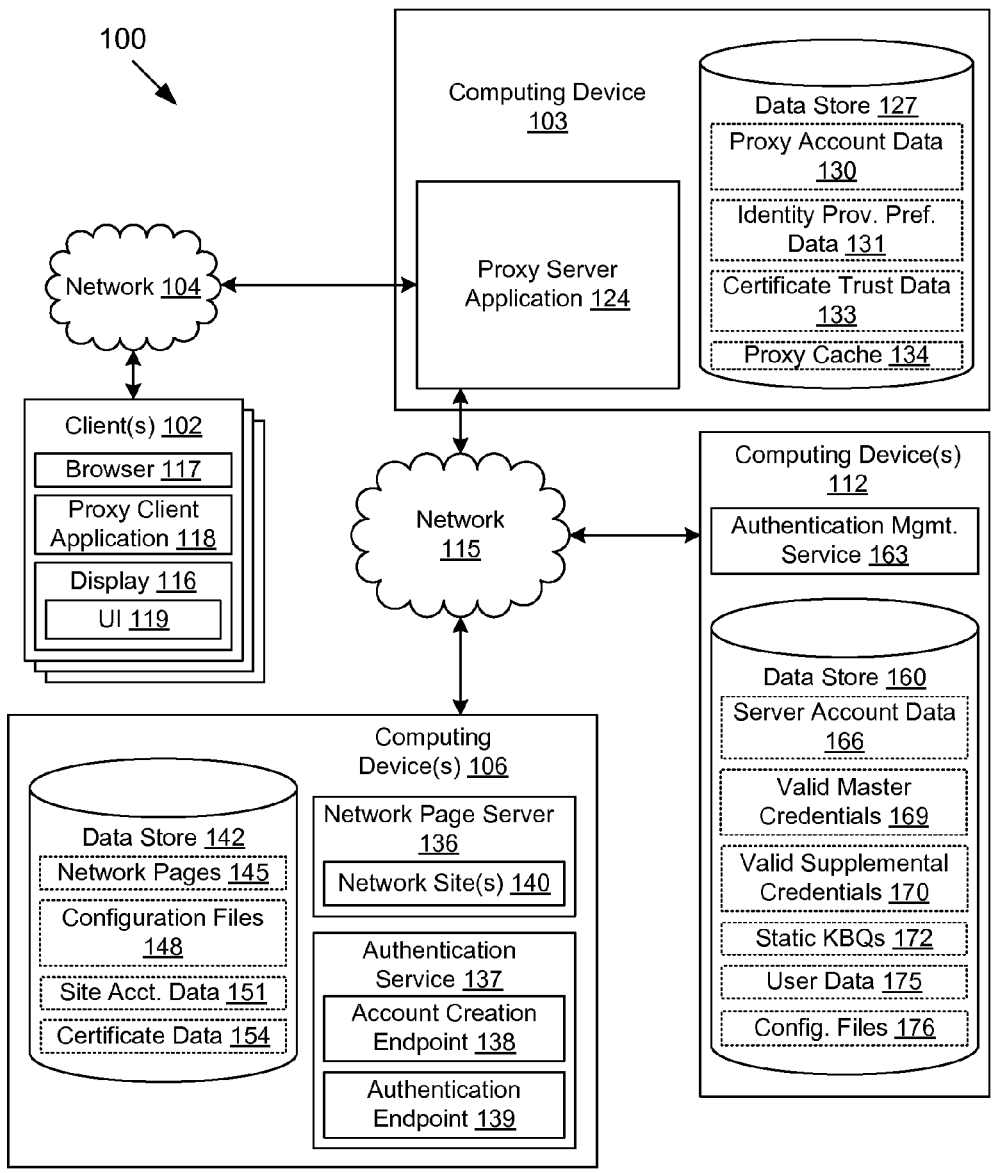
FIG. 1 is a drawing of a networked environment according to various embodiments of the present disclosure.

The present disclosure relates to account management for network sites through the use of a proxy server. Such account management may include managing security credentials such as usernames, passwords, security keys, and/or other security credentials. Although passwords may be a strong security credential when used properly, they are often misused. For example, a user may set a relatively weak password, such as a word from a dictionary or a password that is otherwise easy to guess. A user may also set the same password for multiple accounts across multiple network sites and with different security requirements. Thus, if one account is compromised, all other accounts using the same password are also vulnerable.

Thus, many problems associated with using passwords as a security credential are caused by humans being unable to process the type of data that passwords represent. Strong passwords often contain random characters and are long, which makes them hard to remember. Passwords are often not a single chunk of information and can stretch the limits of human working memory. The system disclosed herein largely separates the user from the password, thereby resolving many of these issues. For example, the system may automatically generate a unique, strong password for each network site, using characters selected from the entire set of characters acceptable by the network site. This can provide excellent resilience to brute force, rainbow table, and/or other attacks. In ordinary use, the user may not need to know the password for the network site. Further, the system may store the password on a server and make the password available to the user across multiple client devices, even on public-use client devices such as kiosks, etc. Access to the centrally stored passwords may be protected by knowledge-based questions, master passwords, and/or other approaches. Various techniques for strong credential lifecycle management are described by U.S. patent application Ser. No. 13/194,287 entitled "MANAGING SECURITY CREDENTIALS" and filed on Jul. 29, 2011, which is incorporated herein by reference in its entirety.

In various embodiments, accounts may be created automatically by an authentication management proxy server providing a base set of information about a user to an account creation endpoint of a network site or identity provider. Accounts may be upgraded as necessary by providing additional information to access certain secured resources. Multiple users may be able to login to the authentication management proxy server, which may allow the users to create respective accounts and to access secured resources of network sites by authenticating using the authentication management proxy server. In some embodiments, multiple authentication management services may be available, and may be offered potentially by competing entities. Some network sites or identity providers may support some of the authentication management services but not others. Users may migrate from one authentication management service to another.

In various embodiments, an authentication management proxy server presents security credentials to network sites (or identity providers) according to a domain name of the network site using domain name matching or other groupings. Some network sites may support authentication using multiple identity providers. Users may store preferences for preferred identity providers to be used by an authentication management proxy server where multiple identity providers are available. In some situations, accounts and security credentials managed by an authentication management service may be recovered and used only by preauthorized proxy servers. Also, credentials may be changed or exported to facilitate use outside of the authentication management proxy server. In some embodiments, where the authentication management proxy server facilitates logging into multiple network sites using multiple accounts, the authentication management proxy server may be configured to provide automatic logout functionality for the multiple network sites.

Various relevant techniques relating to proxy server applications are discussed in U.S. patent application entitled "ACCOUNT MANAGEMENT FOR MULTIPLE NETWORK SITES" filed on Feb. 1, 2012, having application Ser.

No. 13/363,654, U.S. patent application entitled "AUTHENTICATION MANAGEMENT SERVICES" filed on Feb. 1, 2012, having application Ser. No. 13/363,664, U.S. patent application entitled "PRESENTING MANAGED SECURITY CREDENTIALS TO NETWORK SITES" filed on Feb. 1, 2012, having application Ser. No. 13/363,675, U.S. patent application entitled "RECOVERY OF MANAGED SECURITY CREDENTIALS" filed on Feb. 1, 2012, having application Ser. No. 13/363,681, U.S. patent application entitled "LOGOUT FROM MULTIPLE NETWORK SITES" filed on Feb. 1, 2012, having application Ser. No. 13/363,685, U.S. patent application entitled "MAPPING STORED CLIENT DATA TO REQUESTED DATA USING METADATA" filed on Nov. 16, 2012, having application Ser. No. 13/679,254, which are incorporated herein by reference in their entirety.

In contrast to techniques involving a proxy server application installed on an end-user client device, the various embodiments disclosed herein employ a proxy server to provide the account and authentication management functionality. In many embodiments, a proxy server may be used to provide this functionality without the need for a proxy server application to be installed on end-user devices. Such embodiments may be especially helpful with limited-capability devices where installation permissions are restricted, e.g., a public-access kiosk or other system. Also, such embodiments may be helpful from the standpoint of ease of configuration where multiple end-user devices are involved, e.g., laptops, electronic book readers, smartphones, etc. In the following discussion, a general description of the system and its components is provided, followed by a discussion of the operation of the same.

With reference to FIG. 1, shown is a networked environment 100 according to various embodiments of the present disclosure. The networked environment 100 includes one or more clients 102 that may be in data communication with one or more computing devices 103 by way of a network 104. The computing devices 103 may be in data communication with one or more computing devices 106 and one or more computing devices 112 by way of a network 115. The networks 104, 115 includes, for example, the Internet, intranets, extranets, wide area networks (WANs), local area networks (LANs), wired networks, wireless networks, or other suitable networks, etc., or any combination of two or more such networks. Alternatively, the client 102 may be in communication with the proxy server application 124 by way of the network 115, i.e., the networks 104 and 115 may be the same network in some embodiments.

The client 102 may comprise, for example, a computer system such as a desktop computer, a laptop computer, personal digital assistants, cellular telephones, smartphones, set-top boxes, music players, web pads, tablet computer systems, game consoles, electronic book readers, kiosks, or other devices with like capability. Further, the client 102 may also comprise any device that is network capable that may communicate with the computing devices 103 over the network 104 to perform various functions. Such clients 102 may comprise, for example, processor-based devices having processor circuits comprising a processor and a memory. The client 102 may include a display 116. The display 116 may comprise, for example, one or more devices such as liquid crystal display (LCD) displays, gas plasma-based flat panel displays, organic light emitting diode (OLED) displays, LCD projectors, or other types of display devices, etc.

In various embodiments, the client 102 may correspond to a limited-capability computing device such as, for example, a handheld mobile device, a kiosk, and/or other types of computing devices that may lack a full size keyboard, have limited display area, have limited processor and memory capability, or have limited capabilities in other respects. Consequently, it may be relatively difficult for a user to enter text using the client 102 or to interact with applications that are configured for larger displays 116. In some cases, the capabilities of the client 102, or certain programs executed by the client 102, may be administratively limited.

The client 102 may be configured to execute various applications such as a browser 117, a proxy client application 118, and/or other applications. The browser 117 may be executed in a client 102, for example, to access and render network pages, such as web pages, gopher pages, mobile application content, or other forms of network content served up by the computing devices 103 and/or other servers. The proxy client application 118 may be executed to provide a session with a proxy server (i.e., a computing device 103) for the purpose of differentiating users and/or clients 102 that may employ the same network address on the network 104. The client 102 may be configured to execute applications beyond the browser 117 and the proxy client application 118 such as, for example, e-mail applications, instant message applications, and other applications. The browser 117 and/or other applications executed in the client 102 may render a user interface (UI) 119 on the display 116.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above. In various embodiments, the computing device 103 may correspond to a router, a wireless router, a firewall, a cable modem, a digital subscriber line (DSL) modem, or other form of networking device to provide connectivity from the network 104 to the network 115.

The computing device 103 is configured to execute various applications such as, for example, a proxy server application 124 and/or other applications. The proxy server application 124 may be executed to provide proxy functionality for hypertext transfer protocol (HTTP) and/or other protocols. In addition, the proxy server application 124 may be executed to manage user accounts for network sites and identity providers, including usernames, passwords, private and public keys, certificates, and/or other security credentials. In some cases, the browser 117 in the client 102 may be modified to support authentication through the use of the proxy server application 124. The proxy server application 124 may correspond to a trusted proxy for a home or other controlled network environment such that client 102 may not need to be authenticated. Alternatively, the proxy server application 124 may be an open proxy for which clients 102 are authenticated. If the proxy server application 124 is an open proxy, client 102 may need to reenter security credentials periodically or in response to a detected condition.

The computing device 103 includes a data store 127, and potentially other data stores, which may comprise data and applications configured to provide access to the data. The data store 127 may be used to store proxy account data 130, identity provider preference data 131, certificate trust data 133, a proxy cache 134, and/or potentially other data. The proxy account data 130 may include, for example, security credentials used to access various network sites or network pages, information regarding authentication endpoints, and/or other information. In various embodiments, proxy account data 130 may be stored in an encrypted format. In various embodiments, proxy account data 130 may be stored ephemerally such that the security credentials are erased upon expiration of a client session of the proxy server application 124. In one embodiment, the data store 127 may store an encrypted key that may be decrypted in response to a master security credential obtained from the user. The decrypted key may then be used to decrypt the proxy account data 130.

The proxy account data 130 may also include a set of information about the user that may be employed by the proxy server application 124 in automatically creating or upgrading an account. Such information may include, for example, first name, last name, middle initial or middle name, email address, phone number, physical address, date of birth, and/or other information. The stored user information may be divided into more sensitive sets and less sensitive sets, which may be highlighted when a user provides consent to share the information. In one embodiment, information deemed less sensitive may be shared by default to create or upgrade accounts. If user information is requested for account creation or upgrade but is not stored in the proxy account data 130, a form may be encoded by the proxy server application 124 for rendering by the browser 117 for the user to provide the missing information. In one embodiment, a "base" set of information may be defined by a standard.

The identity provider preference data 131 may indicate user preferences for identity providers to be used by the proxy server application 124 where multiple identity providers are available for a network site. Certificate trust data 133 may describe trusted certificate authorities that issue digital certificates used by network sites. Certificate trust data 133 may comprise, for example, public keys associated with the trusted certificate authorities. The public keys may be used to validate the digital signature of a trusted certificate authority on a digital certificate. In various embodiments, some or all of the proxy account data 130, the identity provider preference data 131, and/or the certificate trust data 133 may be stored in the client 102 and transmitted to the proxy server application 124 for storage in the data store 127 on an as-needed basis. In one embodiment, the proxy cache 134 may be used by the proxy server application 124 to store network pages and/or other network resources for faster access by the clients 102. It is noted that the proxy cache 134 may store data that is globally available to all users and/or clients 102. By contrast, the proxy account data 130, the identity provider preference data 131, and the certificate trust data 133 may be maintained on a user-segregated basis.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

The computing device 106 is configured to execute various applications such as, for example, a network page server 136, an authentication service 137 having an account creation endpoint 138 and an authentication endpoint 139, and other applications. The network page server 136 is configured to serve up network pages, such as web pages, and other data from the computing device 106 to various clients 102 by way of the proxy server application 124. The network page server 136 may be configured to send network pages by HTTP, hypertext transfer protocol secure (HTTPS), or some other protocol. The network page server 136 may employ encryption using, for example, secure sockets layer (SSL), transport layer security (TLS), and/or some other approach. Non-limiting examples of network page servers 136 include Apache® HTTP Server, Apache® Tomcat, Microsoft® Internet Information Services (IIS), and other server applications.

The network page server 136 may be configured to serve up one or more network sites 140. Such a network site 140 is said to be hosted by the network page server 136. A network site 140 may include a set of network pages and/or files associated with a domain name, such as a canonical name, and a directory, such as a root directory (i.e., "/") or some other directory. Each network site 140 may be associated with distinct configuration settings in the network page server 136, while other default configuration settings may be shared across network sites 140.

The authentication service 137 is executed to facilitate account creation and authentication. The authentication service 137 may be operated by the network site 140 or may be employed by multiple network sites 140. Where the authentication service 137 is employed by multiple network sites 140, the authentication service 137 may be referred to as an identity provider. As an identity provider, the authentication service 137 may be used by many different network sites 140 operated by many different entities. In some cases, a network site 140 may support multiple authentication services 137 or identity providers. In various embodiments, the network sites 140 and the authentication services 137 may be executed in the same computing device 106 or in different computing devices 106.

The account creation endpoint 138 may comprise a network page and/or software configured to facilitate creation of one or more accounts and/or the establishment of security credentials for existing accounts for one or more users at a client 102 for one or more network sites 140 using an account creation protocol. In various embodiments, the proxy server application 124 communicates with the account creation endpoint 138 through the network page server 136. To this end, the account creation endpoint 138 may be a plug-in or other module of the network page server 136, a script or other software embedded within a network page or otherwise within a network site 140 and executed by way of an interpreter or a common gateway interface, or accessed in some other way through the network page server 136. In other embodiments, the account creation endpoint 138 may be a server application executing on the same or a different computing device 106 as the network page server 136.

The authentication endpoint 139 may comprise a network page and/or software configured to facilitate authentication of a user session at a client 102 for one or more network sites 140. In various embodiments, the proxy server application 124 communicates with the authentication endpoint 139 through the network page server 136. To this end, the authentication endpoint 139 may be a plug-in or other module of the network page server 136, a script or other software embedded within a network page or otherwise within a network site 140 and executed by way of an interpreter or a common gateway interface, or accessed in some other way through the network page server 136. In other embodiments, the authentication endpoint 139 may be a server application executing on the same or a different computing device 106 as the network page server 136.

The computing device 106 includes a data store 142 and potentially other data stores, which may comprise data and applications configured to provide access to the data. The data store 142 may be used to store network pages 145, configuration files 148, site account data 151, certificate data 154, and/or potentially other data. Network pages 145 may include the network pages and/or files served up for the network sites 140 hosted by the network page server 136. Configuration files 148 may include one or more security credential specifications and/or describe an interface of one or more account creation endpoints 138 and/or authentication endpoints 139. Site account data 151 comprises security credentials and/or other data associated with users of one or more network sites 140. Certificate data 154 comprises digital certificates that may be used by the network page server 136, the authentication endpoint 139, and/or other applications on the computing device 106 to identify a network site and/or encrypt data.

The computing device 112 may comprise, for example, a server computer or any other system providing computing capability. Alternatively, a plurality of computing devices 112 may be employed that are arranged, for example, in one or more server banks or computer banks or other arrangements. For example, a plurality of computing devices 112 together may comprise a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in the various arrangements as described above. In some embodiments, the computing device 103 and the computing device 112 may be the same devices and/or controlled by a common provider entity.

Various applications and/or other functionality may be executed in the computing device 112 according to various embodiments. Also, various data is stored in a data store 160 that is accessible to the computing device 112. The data store 160 may be representative of a plurality of data stores 160 as can be appreciated. The data stored in the data store 160, for example, is associated with the operation of the various applications and/or functional entities described below.

The components executed on the computing device 112, for example, include an authentication management service 163 and other applications, services, processes, systems, engines, or functionality not discussed in detail herein. The authentication management service 163 is executed to provide access to security credentials stored by the computing device 112 in association with a user account with a network site 140. In various embodiments, the authentication management service 163 may be configured to generate user accounts and/or establish security credentials with the network site 140 on behalf of a user at a client 102. In various embodiments, the authentication management service 163 may authenticate clients 102 through the proxy server application 124 using a master security credential and/or knowledge-based questions.

In one embodiment, the authentication management services 163 are registered in a directory of such services. Such a directory may be maintained by an impartial third party. The authentication management services 163 may be differentiated with respect to one another. Some authentication management services 163 may, for example, offer a privacy-friendly service that ensures users that their browsing habits are not being profiled by the authentication management service 163. Other authentication management services 163 may choose to track logins performed by the proxy server application 124. Users may be able to migrate their account data from one authentication management service 163 to another authentication management service 163 by way of a migration protocol.

The data stored in the data store 160 includes, for example, server account data 166, valid master credentials 169, valid supplemental credentials 170, static knowledge-based questions 172, user data 175, configuration files 176, and potentially other data. The data stored in the data store 160 may be partitioned into user-specific data and global data. The server account data 166 includes security credentials for users for authentication to network sites 140. Such security credentials may be stored in an encrypted form or a non-encrypted form. The server account data 166 may also include information regarding account creation endpoints 138, authentication endpoints 139 and/or other information. The proxy server applications 124 may be configured to update and synchronize the server account data 166 with the proxy account data 130 frequently to ensure freshness when the user logs in via multiple proxy server applications 124.

The valid master credentials 169 are employed to authenticate users for the authentication management service 163. In one example, the valid master credentials 169 may correspond to hashed versions of a master security credential established by users. The valid supplemental credentials 170 correspond to supplemental credentials that may also be employed to authenticate users for the authentication management service 163. Unlike the master security credential, a combination of one or more valid supplemental credentials 170 along with correct answers to one or more knowledge-based questions may be needed for a user to be authenticated. Respective weights may be applied to each component of a score used to determine authentication.

The static knowledge-based questions 172 correspond to knowledge-based questions for which the user has preconfigured an answer. Such questions may be selected by the user or may be preselected. The user data 175 corresponds to various data associated with users. Such user data 175 may relate to purchase transactions of a user with an online retailer, browsing history, order history, search history, profile information, and/or other data. The user data 175 may be employed to generate dynamic knowledge-based questions as will be described. The user data 175 may correspond to data describing the interactions of a user with a network site 140 in some embodiments.

The configuration files 176 may include one or more security credential specifications and/or describe an interface of one or more account creation endpoints 138 and/or authentication endpoints 139. While the data in the data store 160 that has been previously discussed has been of a user-specific nature, the configuration files 176 may be non-user specific and thus may be considered global data.

Next, a general description of the operation of the various components of the networked environment 100 is provided. To begin, a user may configure the browser 117 to route network resource requests to the proxy server application 124. Alternatively, the browser 117 may be preconfigured or may become automatically configured to use the proxy server application 124. In some cases, the proxy client application 118 may be installed and configured to facilitate communication between the browser 117 and the proxy server application 124. In one embodiment, the user may browse to a particular network site 140 hosted by a proxy provider, enter a network site address, and then the traffic may be routed by the proxy server application 124 associated with the proxy provider. When the client 102 accesses the network 115, the proxy server application 124 may send data encoding user interfaces 119 to the client 102 in order to facilitate configuration of the proxy server application 124 for authentication and account management functionality. Such configuration may be optional, and the proxy server application 124 may function as a conventional proxy without such configuration.

Through the user interfaces 119, the user may configure the operation of the proxy server application 124 for existing accounts associated with network sites 140. For example, the user may provide to the proxy server application 124 and/or the authentication management service 163 existing security credentials such as, for example, usernames, passwords, security keys, certificates, and/or other security credentials along with identifying information for the network sites 140 and/or uniform resource locators (URLs) associated with the security credentials. The proxy server application 124 may be associated with one or more of multiple authentication management services 163. The proxy server applications 124 may or may not interact with the authentication management services 163 by way of a standard authentication management protocol. In some cases, the user interface 119 encoded by the proxy server application 124 may show some logo or other branding associated with a corresponding authentication management service 163.

The user may also configure a security credential such as, for example, a username, password, biometric identification, etc. for the proxy server application 124 so that the security credentials may be encrypted or otherwise protected from use or view on the client 102 without the authorization of the user. In one embodiment, upon user configuration of the proxy server application 124, the proxy server application 124 encrypts the proxy account data 130 using a randomly-generated, high-entropy master key. This master key may, in turn, be encrypted to a user-specified master key, which may be stored along with the proxy account data 130 to allow for local decryption.

Where the security credentials are stored in the server account data 166 of the computing devices 112, the user may establish a valid master credential 169 with the authentication management service 163. In one embodiment, the server account data 166 for the user may be stored in an encrypted form. In one embodiment, the server account data 166 for the user is encrypted using a security credential generated as the result of an SSL/TLS session between the computing device 103 and the computing device 112, e.g., a Rivest Cipher 4 (RC4) symmetric key or some other security credential. The encryption may be performed in the proxy server application 124 so that security credential details are not given in the clear to the authentication management service 163. In some cases, the user may configure answers to static knowledge-based questions 172 with the authentication management service 163.

The account information may be stored by the proxy server application 124 in proxy account data 130 in the data store 127 and/or at some other location. For example, the proxy server application 124 may back up the account information to server account data 166 located on the computing device 112, and/or another location. Various techniques relating to storage of the account information on the computing device 103 are described by U.S. patent application Ser. No. 12/539,886 entitled "AUTHENTICATION MANAGER" and filed on Aug. 12, 2009, which is incorporated herein by reference in its entirety.

In some embodiments, the account information may be centrally hosted in the server account data 166 of the computing devices 112. When the computing devices 112, or other storage locations are used to store account information, a user may be able to use different proxy server applications 124. Additionally, various functions that are described as being performed by the proxy server application 124 may instead be performed by the authentication management service 163. For example, the authentication management service 163 may be configured to create accounts, regenerate security credentials, etc. in place of the proxy server application 124. The proxy server application 124 in some cases may be characterized as a client application of the authentication management service 163.

In one embodiment, the proxy server application 124 may be configured to download the entirety of the server account data 166 associated with a given user, to be stored in the proxy account data 130. In another embodiment, the proxy server application 124 may be configured to download only a specific portion of the server account data 166 for a given user, to be stored in the proxy account data 130. For example, the proxy server application 124 may provide a byte range, account identifier, or other identifier corresponding to specific account information to be downloaded from the server account data 166. The specific portion may be determined in response to a request to access a network site 140 obtained from the client 102.

Security credentials may be shared among multiple users and/or multiple clients 102 of the proxy server application 124. As a non-limiting example, several users in an organization may share an online banking account. A first user may create a username and password for the account using the proxy server application 124 and/or the authentication management service 163. The first user may mark the account as shared and provide a list of users that are authorized to access the account, including a second user. When the account is distributed to proxy account data 130, server account data 166, it may be secured such that only the authorized users can access it.

When a user accesses a network site 140 with the browser 117 or another application, the proxy server application 124 determines whether the network site 140 is associated with stored account information, which may be stored, for example, centrally in the server account data 166 or locally in the proxy account data 130. The proxy server application 124 may communicate with an authentication service 137 of the network site 140 or of a separate identity provider.

The proxy server application 124 may refer to the domain name of the network site 140 in order to correlate a stored account with the network site 140. In some cases, multiple network sites 140 having different domain names may use the same stored account. Sometimes, this determination may be based on a portion of the domain name, such as the second-level domain portion. As a non-limiting example, a company may have several network sites 140 with different domain names for various geographic locales or generic top-level domains, e.g., "e-retailer.com," "e-retailer.net," "e-retailer.co.uk," "e-retailer.eu," "e-retailer.co.jp," and so on. The proxy server application 124 may identify the user account according to the string "e-retailer" being in the domain name, rather than an exact match of the domain name. However, the matching may not be dispositive, and the network sites 140 may in fact be unrelated. Accordingly, the identification of the account may be presented to the user for explicit confirmation before any secured information from a stored account is exchanged with the network site 140.

If the network site 140 is not associated with stored account information, then the proxy server application 124 may notify the user and may prompt the user to provide security credentials if the user has an existing account. The user-provided security credentials may then be stored by the proxy server application 124 in one or more of proxy account data 130 or server account data 166.

Alternatively, or additionally, the proxy server application 124 and/or the authentication management service 163 may assist the user in creating an account for the network site 140. The account may be a one-time account, a first account for the user, or a second or subsequent account for the user. The proxy server application 124 and/or the authentication management service 163 may determine how to create an account for a network site 140 based, for example, on the structure of a form embedded within a network page 145. Such a form may be defined in hypertext markup language (HTML), extensible markup language (XML), or some other language.

As a non-limiting example, the proxy server application 124 may identify an account creation form when a submit input element on a network page 145 is associated with text such as "Create Account." The proxy server application 124 may also examine the URL for relevant keywords. As another non-limiting example, the proxy server application 124 may identify an account creation form when a challenge response test (e.g., a "Captcha") is present. The proxy server application 124 may automatically identify required fields for security credentials using, for example, input elements on a network page 145 named "username," "password," or other identifiable names. In various embodiments, the proxy server application 124 may encode a user interface 119 to have the user identify the account creation form and/or tag input elements of the form so that the proxy server application 124 may accurately identify how the account may be created with form filling. Such a list of tags can be stored in a configuration file 176 which may then be uploaded to a computing device 112. There, the configuration file 176 can be accessed by other users using the proxy server application 124 and used by them to simplify account creation on the network site 140 described by the configuration file 176. Alternatively, or additionally, configuration files 176 may be stored by the computing device 112 to be accessed by the proxy server application 124, the authentication management service 163, and/or other applications.

In various embodiments, the proxy server application 124 and/or the authentication management service 163 may create the account in an automated way through methods other than form filling. For example, the proxy server application 124 and/or the authentication management service 163 may obtain a configuration file 148 associated with the network site 140 from either the network page server 136 for the network site 140 or a computing device 112 that may provide a configuration file 176 associated with the network site 140. The configuration file 148, 176 may define one or more account creation endpoints 138 for the network site 140 where the proxy server application 124 and/or the authentication management service 163 may authenticate and/or create an account other than by filling out a form. For example, the configuration file 148, 176 may define the URL, parameters, encoding, and/or other information required to create an account in an automated way through an account creation endpoint 138. In some embodiments, one account creation endpoint 138 may be shared by multiple network sites 140 and/or network page servers 136. To prevent unauthorized automatic creation of accounts, the proxy server application 124 and/or the authentication endpoint 139 may include "Captchas," limit velocity of account creation, and/or take other measures.

The configuration file 148, 176 may also include a security credential specification associated with the network site 140. The security credential specification may specify a character set, minimum length, maximum length, and/or other parameters for usernames and/or passwords. The security credential specification may also specify minimum key length, acceptable algorithms and formats, and/or other parameters applicable to public key infrastructure or other types of security credentials.

The proxy server application 124 and/or the authentication management service 163 may generate one or more security credentials based on the security credential specification. In one embodiment, the authentication management service 163 may be configured to obtain the security credential specifications according to a subscription-based push model. In another embodiment, the authentication management service 163 may be configured to pull the security credential specifications from the computing device 106 at regular intervals.

When the proxy server application 124 and/or the authentication management service 163 is creating an account by form filling, the proxy server application 124 may encode a user interface 119 prompting the user to supply a security credential specification so that the proxy server application 124 and/or the authentication management service 163 may generate one or more security credentials to be filled in on the form. The user may see information regarding required attributes for security credentials displayed on the network page 145 near the account creation form. The proxy server application 124 may provide options including, but not limited to, length of the security credential, directions to use a certain character set, directions to use at least one number, directions to use at least one non-alphanumeric character, and other options.

As a non-limiting example, the proxy server application 124 may encode a user interface 119 listing various attributes that may be used in generating the security credentials. Such a user interface 119 may include, for example, checkboxes, radio buttons, drop-down boxes, text fields, text areas, etc. The user interface 119 may be preconfigured with default selections. Where the security credentials are generated by the authentication management service 163, the authentication management service 163 may perform the form filling, or the security credentials may be transferred to the proxy server application 124 for the proxy server application 124 to perform the form filling.

In various embodiments, when the proxy server application 124 is creating an account by form filling, the proxy server application 124 may replace, for example, the normal user interaction in filling out the form with a wizard interface. The wizard interface may omit tasks or fields that may be done automatically by the proxy server application 124. However, the wizard interface may obtain input from the user in order to fill out fields such as "Captchas" and other challenge response tests. Although the proxy server application 124 and/or the authentication management service 163 may be configured to fill out fields pertaining to other personal information (e.g., name, date of birth, social security number, phone number, address, etc.), the proxy server application 124 may instead be configured to encode a user interface 119 that prompts the user for that information. In various embodiments, the proxy server application 124 may leave unrecognized form fields blank for the user to complete.

Accordingly, the proxy server application 124 sends an account creation request associated with the generated security credential to the network site 140. After the account creation request is submitted, the account will either be created or not created for the network site 140. The network site 140 typically provides a response page indicating whether the account creation was successful. Such a network page 145 may be parsed automatically by the proxy server application 124 or may be left for additional user input to the proxy server application 124.

In some cases, the response page will include another form with an indication that there was a problem. As a non-limiting example, a username field may be highlighted with an explanation that the specified username was already taken. The proxy server application 124 may be configured to respond automatically to such requests and/or to encode user interfaces 119 seeking further user input. Account creation responses through an authentication endpoint 139 may be handled by the proxy server application 124 in an analogous way. In one embodiment, the proxy server application 124 may simply assume that the account was created.

Responsive to account creation, the proxy server application 124 and/or the authentication management service 163 store the account information including, but not limited to, security credentials, URLs, and domain names associated with the account and network site 140, in one or more of proxy account data 130, or server account data 166. In particular, the network site 140 or authentication endpoint 139 may present a trusted certificate from certificate data 154 during the account creation process. Information relating to this trusted certificate, including domain name, certificate authority, and other information from the certificate, may be stored with the account information.

The account information may consequently be marked as usable on a network site 140 corresponding to the domain name provided in the trusted certificate, or only for a network site 140 able to present that specific certificate in higher assurance environments. Account information stored in any of proxy account data 130, or server account data 166 may be manually or automatically copied by the proxy server application 124 and/or the authentication management service 163 to any other proxy account data 130 or server account data 166 so that the account information may be mirrored across proxy account data 130 or server account data 166.

For purposes of backup, the proxy server application 124 and/or the authentication management service 163 may be capable of encoding a user interface 119 that renders a list of the stored account information in proxy account data 130 or server account data 166 for viewing or printing. To facilitate viewing or printing, the proxy server application 124 and/or the authentication management service 163 may be configured to generate human readable or printable security credentials using an appropriate character set. Alternatively, the proxy server application 124 and/or the authentication management service 163 may encode security credentials in a printable form using an encoding approach such as, for example, UUencoding, BinHex, Multipurpose Internet Mail Extensions (MIME) encodings, Base64, and other encoding approaches.

In some embodiments, recovery and reset capabilities may be managed on a per-machine basis by the authentication management service 163. In one embodiment, only the first client 102 for a given authentication management account may be capable of recovery. The authentication management service 163 could provide a user interface 119 to manage clients 102, including the ability to allow recovery/reset at additional clients 102. The management may instead be performed at the level of the proxy server application 124 rather than the level of the client 102. Further, different types of account data recovery mechanisms may be supported (e.g., one-time passwords, operating system recovery, credential stored on removable media, etc.), and a subset of these account data recovery mechanisms may be enabled or disabled on a per-client basis. For example, the proxy server application 124 may be configured to request permission to use a particular one of the account data recovery mechanisms. Such a request may include a client-identifying token.

The authentication management service 163 may enable or disable the requested account data recovery mechanism according to whether authorization has been granted to the particular client 102 and/or proxy server application 124. As a non-limiting example, a first registered client 102 (e.g., a home machine) may be able to use all recovery mechanisms, but by default, none of the recovery mechanisms may be available for use on other clients 102 (e.g., a friend's machine). This may be used to preempt the possibility of security attacks through such recovery mechanisms. An interface with the authentication management service 163 may be provided for a user to selectively enable or disable particular recovery mechanisms for particular clients 102.

To facilitate recovery of a lost decryption key, the decryption key may be written to removable media. To improve security in such a situation, the decryption key may be encrypted to a key that is stored in the client 102 and/or the computing device 103 so that the decryption key may be decrypted only at the computing device 103, even if the removable media is stolen. In some embodiments, the decryption key may correspond to an operating system credential that is managed by the operating system of the client 102 and/or the computing device 103.

In some embodiments, a set of one-time passwords may be generated by the proxy server application 124, and each of these may be used to generate additional encrypted versions of the decryption key, each of which may be appended to the proxy account data 130 and server account data 166. To enforce the one-time passwords, each entry is removed by the proxy server application 124 from the proxy account data 130 as it is used. The user may be responsible for keeping these one-time passwords secure outside the system (e.g., on a print out, on a wallet card, etc.).

When a stored account exists for a network site 140, the proxy server application 124 and/or the authentication management service 163 determines whether to provide the security credentials to the network site 140. As a preliminary matter, the proxy server application 124 and/or the authentication management service 163 may require that the user be authenticated to the proxy server application 124 and the authentication management service 163 by way of a master security credential such as a password, biometric identification, native operating system identification, or some other authentication. Responsive to authentication, the proxy server application 124 may decrypt the stored proxy account data 130 or server account data 166. In some embodiments, the proxy server application 124 may be given access to the stored proxy account data 130 or server account data 166 responsive to providing a master security credential. The proxy server application 124 then verifies the identity of the network site 140.

Verifying the identity of the network site 140 may be performed, for example, by comparing a domain name associated with a trusted certificate provided by a network site 140 at the time of logon with the domain name associated with the network site 140 in the stored account information. The proxy server application 124 may compare the domain name associated with the trusted certificate provided by the network site 140, for example, with a domain name provided by a user, a domain name inferred by heuristic analysis, or some other domain name, in order to identify which stored account the network site 140 appears to resemble. Verifying the identity of the network site 140 through the use of trusted certificates may be less susceptible to spoofing attacks than by verifying the identity merely through domain name service (DNS) name resolution, for example, or comparing a stored domain name to what is displayed in the address bar of the browser 117.

If the network site 140 provides no certificate (e.g., authentication under HTTP) or if the certificate is not trusted (e.g., self-signed or issued by a certificate authority not considered to be trusted in the certificate trust data 133), the proxy server application 124 may encode a user interface 119 that displays a warning to the user. In some cases, the user may accept the warning and continue. In some embodiments, the proxy server application 124 may remember such characteristics and use them to aid in future identity verification of the network site 140. In other cases, the proxy server application 124 may identify a clear use of a spoofing attack or other phishing attempt and provide additional warnings, disable authentication at the particular network site 140, require reauthentication by the user to the proxy server application 124, and/or take other precautions. Additionally, by integrating the proxy server application 124 with a site providing reputation data for network sites 140, the proxy server application 124 can warn the user that a network site 140 is hostile.

The proxy server application 124 may additionally verify the identity of the network site 140 by other methods. One verification method may comprise comparing contents of the HTTP headers sent by the accessed network site 140 with a stored URL or domain name. Another verification method may comprise performing a reverse DNS look-up on an Internet Protocol (IP) address associated with the accessed network site 140 and comparing that domain name with a stored URL or domain name. Other verification methods may also be employed. More secure methods may be employed prior to downgrading to less secure methods, and the user may specify acceptable methods of proving the identity of network sites 140.

Once the identity of a network site 140 is verified, the proxy server application 124 may provide the security credentials to the network site 140 automatically through an authentication endpoint 139 or may encode a user interface 119 to obtain user confirmation. If the proxy server application 124 is configured to obtain user input, the proxy server application 124 may encode a user interface 119 to render a button or other user interface feature in or on top of the browser 117 to obtain confirmation.

When no authentication endpoint 139 is defined for a network site 140, the proxy server application 124 may be configured to detect whether an authentication form is presented. The proxy server application 124 may examine the network page 145 for elements such as a submit input element associated with text such as "Log In," input fields matching "username" and/or "password," fields using the password type, explicit metadata defining various authentication parameter types, and other identifying elements. The proxy server application 124 may also examine the URL for relevant keywords. In some embodiments, the proxy server application 124 and/or the authentication management service 163 may store a URL associated with the network site 140 in proxy account data 130 or server account data 166, which may be used for authentication. The proxy server application 124 may provide the security credentials to the network site 140 by form filling. The submission of such a form may be automatic or may be subject to user input such as selection of a "Submit" or "Log In" button or other user interface 119 element.

In some cases, the user may forget the master security credential or may not have access to the master security credential on another client 102. The user may then be able to either reset the master security credential, or gain at least temporary access to stored security credentials, through a procedure implemented by the authentication management service 163. Upon a user selecting a master security credential or reset option, the authentication management service 163 may generate a user interface 119 providing one or more knowledge-based questions. For example, the user interface 119 may correspond to a network page for rendering in the browser 117. Alternatively, data may be sent to the proxy server application 124 in order for a user interface 119 to be encoded by the proxy server application 124.

The user interface 119 may present static knowledge-based questions 172 that are preconfigured by the user. For example, the user interface 119 may present a question of "What is your mother's maiden name?," "In what city were you born?," "What was the mascot of your high school?," and so on. The user interface may present true questions or false questions. True questions correspond to questions that can be validated by both the user and the authentication management service 163 that are unique to the user. False questions are those designed to catch an attacker who is attempting gain unauthorized access to the security credentials. For example, a false question may be: "What was the last payment amount for the truck you lease?" where the correct answer should be: "I do not have a truck."

Furthermore, the user interface 119 may present knowledge-based questions that are dynamically generated by the authentication management service 163. With dynamically generated questions, the user may have no foreknowledge as to what type of questions will be asked. Dynamically generated questions may employ user data 175 including unique customer information such as purchase transaction history and/or other data. One example of a dynamically generated question may be: "I see that you purchased an item from E-Retailer yesterday, can you tell me the bill amount?"

Multiple knowledge-based questions may be presented in a user interface 119. The answers to the knowledge-based questions may be used by the authentication management service 163 to generate a score. When the score meets a predefined threshold (e.g., one question answered correctly, three questions answered correctly, one dynamically generated question based on recent data answered correctly, etc.), the user may be granted access to the stored security credentials of the server account data 166 and/or access to establish a new valid master credential 169. It is noted that different weighting may be applied to different types of questions in generating a score. For example, dynamic questions based on a recent event may be given a greater weight than a static question based on information obtained during account creation. In the case of new or infrequent users for whom insufficient user data 175 is present for dynamically generated questions, the authentication management service 163 may fall back to employ the static knowledge-based questions 172.

Once a user is authenticated by the authentication management service 163 through the use of knowledge-based questions, or through a valid master security credential, security credentials of the user from the server account data 166 may be downloaded to the proxy account data 130 for use by the proxy server application 124. In one example, the client 102 corresponds to a kiosk or another public-use client 102. In such an example, the security credentials may be maintained ephemerally in the memory of the proxy server application 124 such that they are erased or purged from memory when the user logs out, exits the browser 117, or otherwise ends the session of the proxy server application 124. Alternatively, the security credentials may be saved to the proxy account data 130 for future use through the proxy server application 124.

Moreover, once a user is authenticated by the authentication management service 163, the user may be presented with an opportunity to set a new security credential. For example, the user may supply the new security credential with or without the previous security credential. The valid master credentials 169 are updated by the authentication management service 163 to store the new valid master credential 169. It is noted that the valid master credential 169 may be hashed or otherwise encoded.

The authentication management service 163 may also be employed to generate or regenerate security credentials according to security credential specifications in the configuration files 176. In addition to initial account creation and configuration, the authentication management service 163 may be configured to regenerate security credentials periodically or when triggered by a user or administrator. For example, an administrator may trigger an automatic regeneration of security credentials for many users with accounts for a certain network site 140 in response to a potential security compromise. Upon regeneration of the security credentials, the authentication management service 163 may establish the newly generated security credentials with the various network sites 140 using the appropriate account creation endpoint 138. The authentication management service 163 may supply a previous security credential to facilitate establishing the newly generated security credential. The security credentials may be generated or regenerated to have a maximum security strength allowed by the security credential specification.

Where multiple authentication management services 163 are available, proxy server applications 124 may be configured to import/export the proxy account data 130 for use with different authentication management services 163. Proxy server applications 124 may be deployed by different providers of authentication management services 163 or by other parties. In some embodiments, a particular proxy server application 124 may function only with a corresponding authentication management service 163. Thus, the proxy server application 124 may be configured to allow import and export of proxy account data 130 to different proxy server applications 124 for use with different authentication management services 163.

In one embodiment, the authentication management service 163 may provide a revocation user interface 119 in order to revoke security credentials associated with the server account data 166. To facilitate this central revocation, the security credentials in the server account data 166 may be token based, and not based on literal storage of user credentials. Revocation and reset may be performed by the proxy server application 124 in some embodiments. For example, the proxy server application 124 may include a "reset all credentials" function that would automatically reset each credential to a newly generated credential. Knowledge-based questions may be asked of the user to provide an additional check on the identity of the user before performing the automatic credential resets.

In addition to credential resets, the proxy server application 124 may support credential changes to user-specified passwords, etc. Such support may be useful in the case of a user going on vacation without access to the proxy server application 124. The user may want to change the automatically generated security credentials to a single temporary password that may be easy to remember. After returning from vacation, the user may reset the temporary password to new automatically generated security credentials. In one embodiment, the single temporary password may have an expiration period, to be enforced by the authentication management service 163.

Figure 2A:
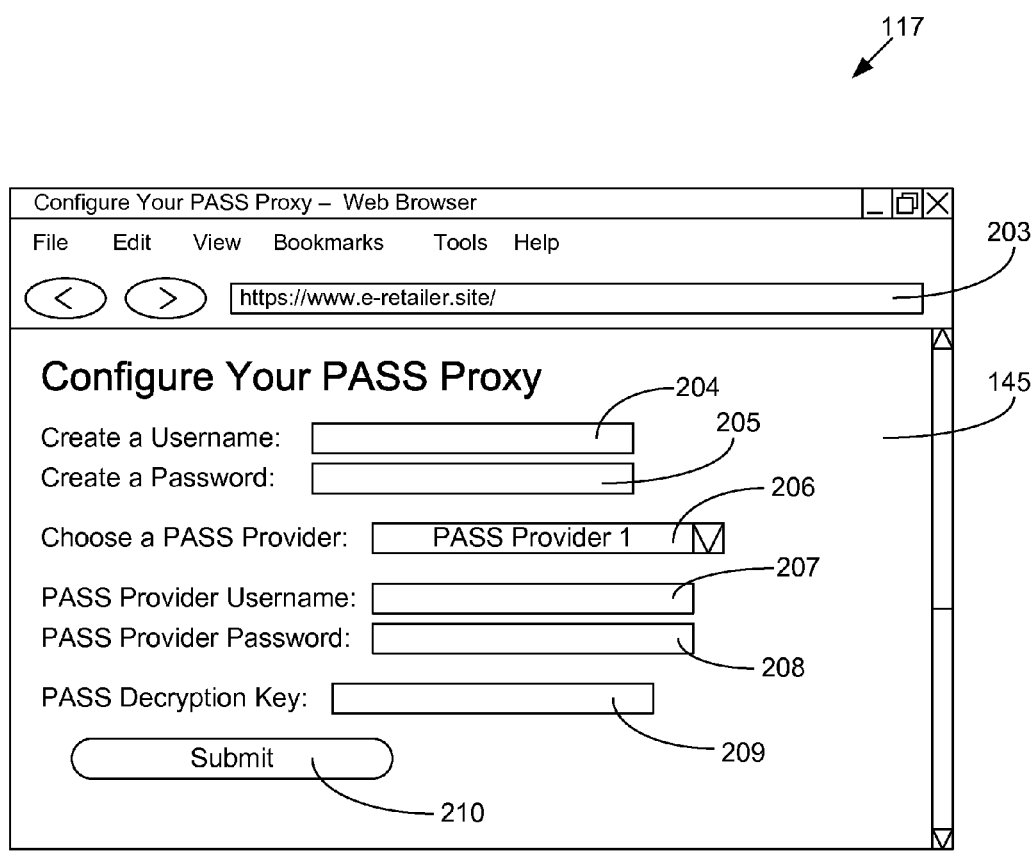
FIGS. 2A-2C are drawings of examples of user interfaces rendered by a client in the networked environment of FIG. 1 according to various embodiments of the present disclosure.

Continuing to FIG. 2A, shown is an example of a network page 145 (FIG. 1) rendered by a browser 117 (FIG. 1) executed in a client 102 (FIG. 1) in the networked environment 100 (FIG. 1) according to various embodiments of the present disclosure. In this example, the user may have entered, or may have been automatically redirected to, the URL "https://www.e-retailer.site/," which is displayed in the address bar 203 of the browser 117. However, the request has been intercepted by the proxy server application 124 (FIG. 1), which has provided a network page 145 to facilitate configuration of the proxy server application 124 for the client 102. In other examples, a user may specifically enter a URL corresponding to a configuration network page 145 of the proxy server application 124.

In this non-limiting example, the network page 145 may include a proxy username entry component 204 and a proxy password entry component 205 for the user to provide a proxy username and a proxy password. Such a proxy username and password may enable the proxy server application 124 to distinguish among multiple users. In other embodiments, cookies or other identifiers of clients 102 may be used, or a proxy client application 118 may be used to distinguish among clients 102.

An authentication management provider selection component 206 may facilitate a user selection from multiple possible authentication management services 163 (FIG. 1). An authentication management username entry component 207 and an authentication management password entry component 208 may facilitate entry of a username and password to be used for the selected authentication management service 163. A decryption key entry component 209 facilitates entry of a decryption key used to decrypt account data obtained from the authentication management service 163. It is noted that any of the proxy username and password, authentication management username and password, and/or the decryption key may be stored in the data store 127 in various embodiments. Alternatively, the user may be requested to provide any of the proxy username and password, authentication management username and password, and/or the decryption key for each session with the proxy server application 124 as desired. A submit component 210 facilitates transmission of the entered information from the client 102 to the proxy server application 124.

Figure 2B:
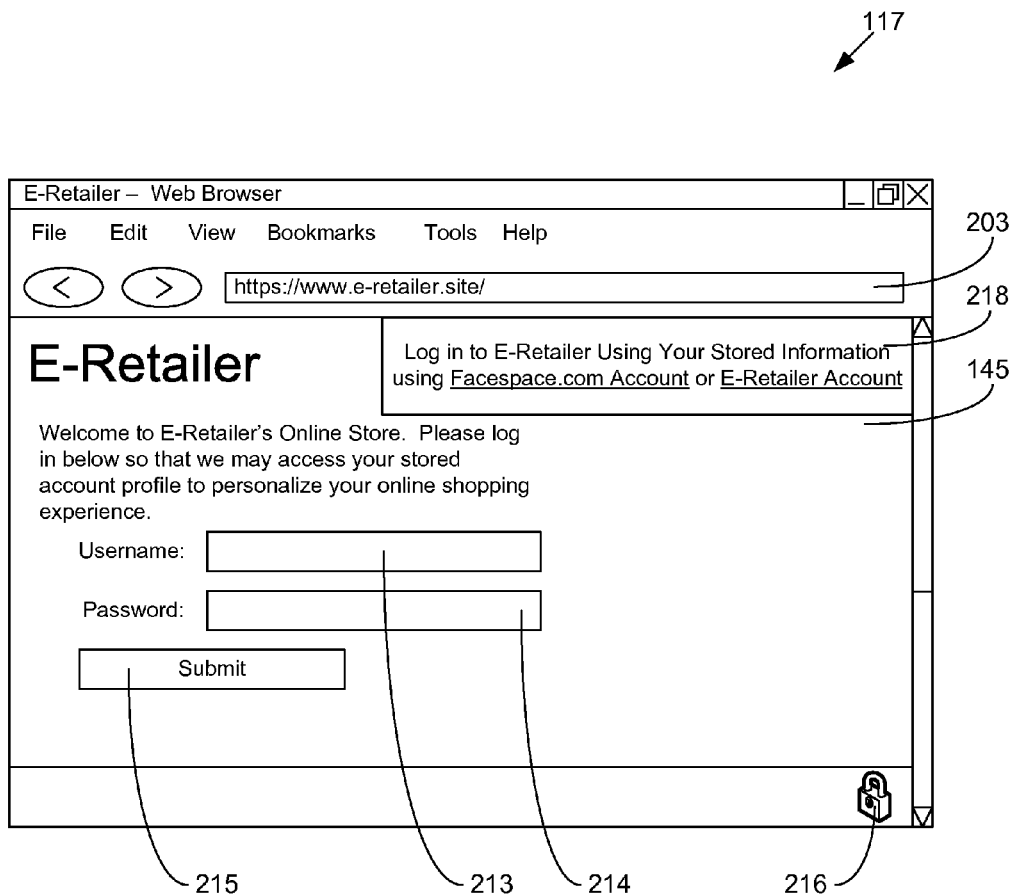

Turning now to FIG. 2B, shown is an example of a network page 145 (FIG. 1) rendered by a browser 117 (FIG. 1) executed in a client 102 (FIG. 1) in the networked environment 100 (FIG. 1) according to various embodiments of the present disclosure. In this example, the user may have entered, or may have been automatically redirected to, the URL "https://www.e-retailer.site/," which is displayed in the address bar 203 of the browser 117. The network page 145 provided by the network site 140 (FIG. 1) in response to the URL includes an authentication form having a username field 213, a password field 214, and a submit button 215.

The browser 117 includes a security indication 216 that indicates that the network site 140 has presented a trusted certificate and the communication between the client 102 and the computing device 106 (FIG. 1) is being encrypted. In FIG. 2B, the proxy server application 124 (FIG. 1) has verified the identity of the network site 140 and is presenting an authentication system selection 218. The authentication system selection 218 indicates that the user has configured the proxy server application 124 and that account information associated with the network site 140 is available. In particular, the authentication system selection 218 allows for selection of account data from among multiple authentication services 137 (FIG. 1), "Facespace.com" (i.e., a federated identity provider) or "E-Retailer" (i.e., the identity provider for the network site 140). It may be assumed in FIG. 2B that the user has previously authenticated with the proxy server application 124 or that an opportunity to authenticate will be presented if a supported authentication service 137 is selected. If account data did not exist, the authentication system selection 218 may allow for account creation with a selected authentication service 137.

Once a user selects the authentication service 137, the proxy server application 124 may fill in the username field 213 and the password field 214 before sending the form request onto the network site 140. In some embodiments, the username field 213 and password field 214 may be prefilled by the proxy server application 124 automatically with the security credential upon verification of the identity of the network site 140. The security credentials may be shown as place holding characters or as plain text.

Alternatively, if, for example, an authentication endpoint 139 (FIG. 1) is defined, the proxy server application 124 or the authentication management service 163 (FIG. 1) may authenticate with the authentication endpoint 139 in the background. The proxy server application 124 may give an indication of success or failure and may provide another user interface element in order to log out of the network site 140.

Figure 2C:
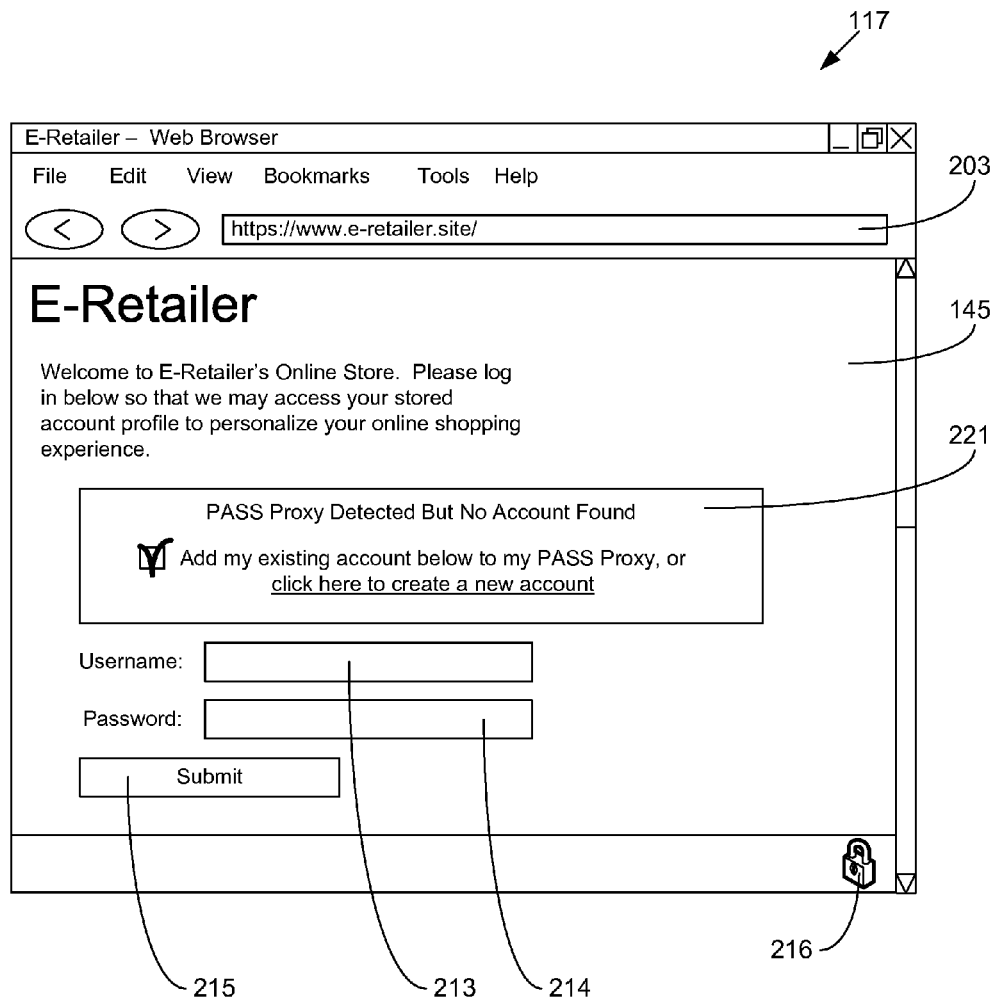

Moving on to FIG. 2C, shown is another example of a network page 145 (FIG. 1) rendered by a browser 117 (FIG. 1) executed in a client 102 (FIG. 1) in the networked environment 100 (FIG. 1) according to various embodiments of the present disclosure. In the example of FIG. 2C, a proxy server application 124 (FIG. 1) is configured, but no account is found for the current network site 140 (FIG. 1). Thus, the user is presented with the username field 213 and the password field 214 and a notification 221 that no account is found. A checkbox or other user interface component may be provided in association with the notification 221 for the user to consent to add the provided legacy account information to the proxy server application 124. Further, a link, button, or other user interface component may be provided for the user to consent to account creation.

Figure 3:
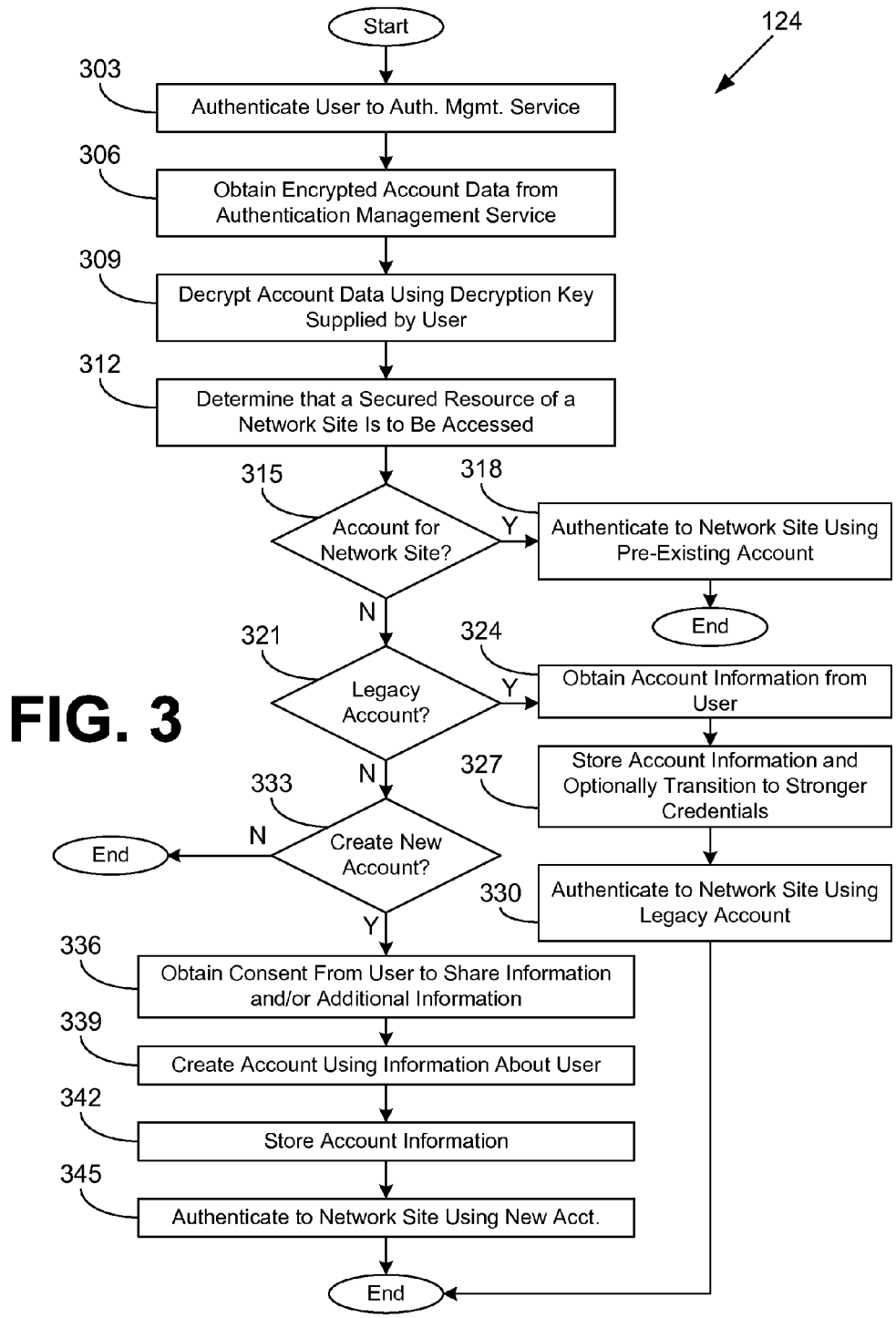
FIGS. 3-6B are flowcharts illustrating examples of functionality implemented as portions of a proxy server application executed in a computing device in the networked environment of FIG. 1 according to various embodiments of the present disclosure.

Referring next to FIG. 3, shown is a flowchart that provides one example of the operation of a portion of the proxy server application 124 according to various embodiments. It is understood that the flowchart of FIG. 3 provides merely an example of the many different types of functional arrangements that may be employed to implement the operation of the portion of the proxy server application 124 as described herein. As an alternative, the flowchart of FIG. 3 may be viewed as depicting an example of steps of a method implemented in the computing device 103 (FIG. 1) according to one or more embodiments.

Beginning with box 303, the proxy server application 124 authenticates a user to an authentication management service 163 (FIG. 1). For example, a user may log in to browser 117 (FIG. 1) or proxy client application 118 (FIG. 1) which is tied to a session of the proxy server application 124. Alternatively, the user may log in to the proxy server application 124 directly. In box 306, the proxy server application 124 obtains encrypted account data from the authentication management service 163. In some cases, this encrypted account data may already be stored in the computing device 103 as proxy account data 130 (FIG. 1). In box 309, the proxy server application 124 decrypts the encrypted account data based at least in part on a decryption key supplied by the user. The decrypted account data may be stored, at least ephemerally, as the proxy account data 130 for use during a user session of the proxy server application 124.

In box 312, the proxy server application 124 determines that a secured resource of a network site 140 (FIG. 1) is to be accessed. For example, the user may employ the browser 117 (FIG. 1) to navigate to a secured network page 145 (FIG. 1) or other secured network resource. In box 315, the proxy server application 124 determines whether the proxy account data 130 includes an account for the network site 140 (or an identity provider used by the network site 140). To this end, the proxy server application 124 may determine one or more authentication services 137 (FIG. 1) associated with the network site 140 having an authentication endpoint 139 (FIG. 1) and an account creation endpoint 138 (FIG. 1). The authentication services 137 may correspond to third-party authentication providers in some cases. The proxy server application 124 may send a query to the network site 140 to determine the supported authentication services 137 and/or may determine the supported authentication services 137 based at least in part on the content of a network resource already obtained by the proxy server application 124.

The proxy server application 124 may determine the existence of an account in the proxy account data 130 according to the domain name of the network site 140 or through other identifying data available from the network site 140. In one embodiment, the proxy server application 124 may query the authentication management service 163 to obtain information to map the domain name of the network site 140 to a stored account. In another embodiment, the proxy server application 124 may perform a matching on at least a portion of the domain name, such as the second-level domain name, e.g., "e-retailer" within "e-retailer.com" and "e-retailer.co.uk." Thus, the different first-level domain names may be ignored when determining which account may be used.

Where a matching is performed across different domain names, an explicit user confirmation may be solicited before an identified existing account is actually utilized. Where multiple accounts are configured for the same base domain name, the account having the longest match may be employed. As a non-limiting example, an account for "us.e-retailer.com" may be preferred to log into "www.e-retailer.com" instead of an account for "e-retailer.com."

If an existing account is identified, the proxy server application 124 authenticates to the authentication service 137 of the network site 140 using the security credentials of the pre-existing account in box 318. Subsequently, the secured resources of the network site 140 may be accessed. In most cases, this authentication may happen automatically without user intervention. However, in some cases (e.g., with high-value transactions), the authentication service 137 may set a flag in the authentication protocol to require explicit consent, thereby forcing the user to consent to the log in using the proxy server application 124. Also, where multiple accounts are identified, the proxy server application 124 may be configured to render a user interface to obtain a user selection of one of the accounts. Thereafter, the portion of the proxy server application 124 ends.

If an existing account is not identified, the proxy server application 124 moves from box 315 to box 321 and determines whether the user has a legacy account, i.e., an existing account not available in the proxy account data 130. To this end, the proxy server application 124 may encode a user interface 119 (FIG. 1) that is configured to prompt the user to enter legacy account information and security credentials, if the user has a legacy account. If the user has a legacy account, in box 324, the proxy server application 124 obtains the legacy account information from the user.

In box 327, the proxy server application 124 stores the legacy account information in the proxy account data 130. In some cases, the proxy server application 124 may transition the provided security credentials to stronger credentials as defined in a security credential specification. The user may be prompted via a user interface 119 to consent to such a credential change. In box 330, the proxy server application 124 authenticates with the network site 140 using the respective authentication service 137 and the legacy account information. Thereafter, the portion of the proxy server application 124 ends.

If the user does not provide legacy account information, or if the user provides a confirmation that the user does not have an existing account capable of being used to access the secured resource, the proxy server application 124 moves from box 321 to box 333. In box 333, the proxy server application 124 determines whether a new account is to be created for the network site 140. For example, the user may have specified a set of information (e.g., name, email address, age, etc.) that may be shared with account creation endpoints 138 in order to create an account. The user may have established rules to automatically consent to the sharing of some information but not other information. If an account is not to be created, e.g., the user does not give consent or stored preferences disallow sharing of the information, the portion of the proxy server application 124 ends. Otherwise, if a new account is to be created for the user, the proxy server application 124 transitions from box 333 to box 336.

In box 336, the proxy server application 124 obtains consent from the user via a user interface 119 to share the information needed to create an account capable of being used to access the secured resource. Such a consent may correspond to an explicit confirmation in a user interface 119, a stored consent preference, and/or other forms of consent. The proxy server application 124 may determine which set of information (out of a superset of information) is needed by obtaining an indication of the particular set from the account creation endpoint 138. The proxy server application 124 may encode a user interface 119 to obtain additional information from the user in some cases. The additional information may include freeform data, multiple choice selections, yes or no answers, and/or other data.

In box 339, the proxy server application 124 automatically creates the account using the set of information about the user by communicating with the account creation endpoint 138. In some cases, the account may be with an operator of the network site 140. In other cases, the account may be with a third-party identity provider, which may enable the account to access multiple secured resources across multiple network sites 140 associated with multiple operators.

In box 342, if the account was created successfully, the proxy server application 124 stores the resulting account information, including, for example, automatically generated security credentials, in the proxy account data 130. In box 345, the proxy server application 124 authenticates with the authentication endpoint 139 of the network site 140 using the new account to facilitate access to the secured resource. Thereafter, the portion of the proxy server application 124 ends.

Figure 4:
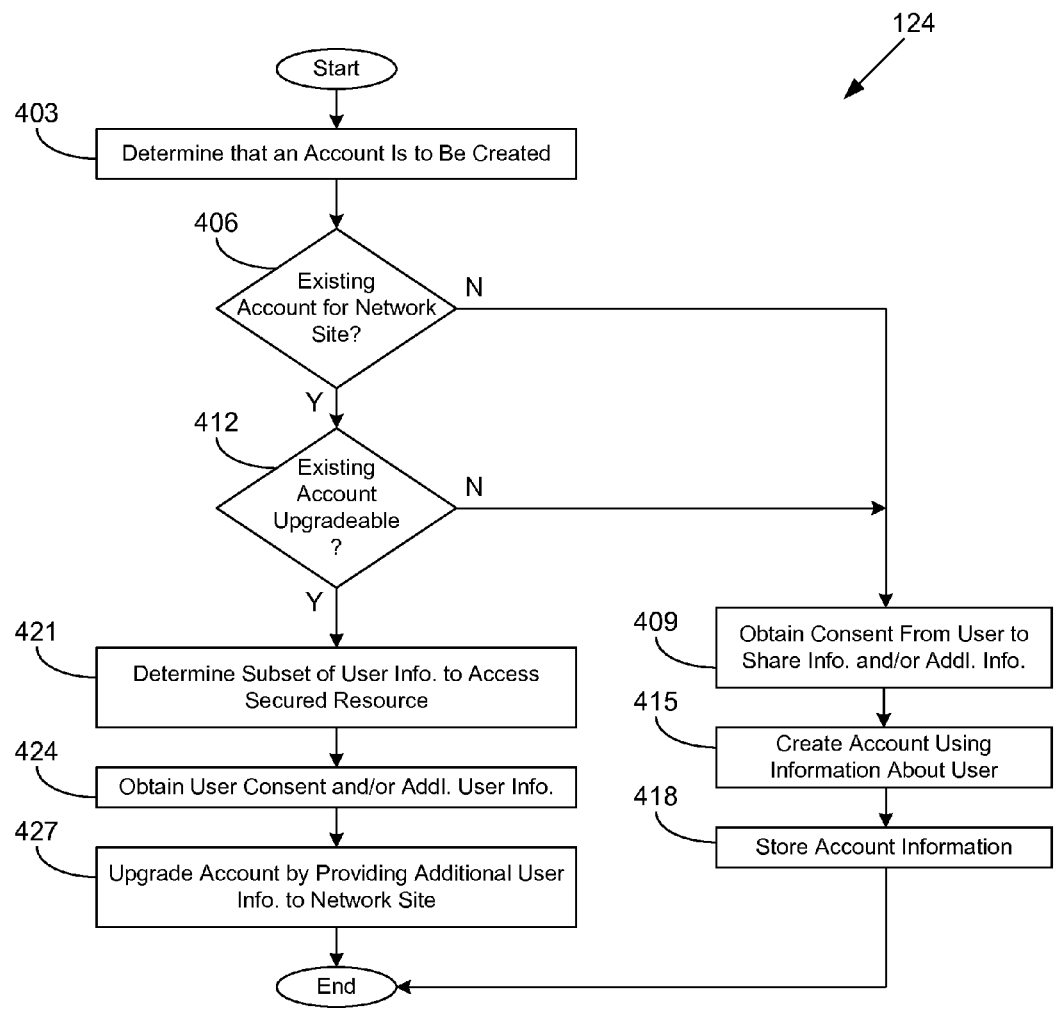

Turning now to FIG. 4, shown is a flowchart that provides one example of the operation of another portion of the proxy server application 124 according to various embodiments. Specifically, FIG. 4 relates to an account creation workflow that may include upgrading an existing account. Upgrading may be performed to access secured resources of a network site that are otherwise not accessible by the existing account. For example, a user may create an account with an online merchant to browse without providing a shipping address, but a shipping address may be necessary to place an order. The user may be able to upgrade the account to place the order by providing the shipping address. It is understood that the flowchart of FIG. 4 provides merely an example of the many different types of functional arrangements that may be employed to implement the operation of the portion of the proxy server application 124 as described herein. As an alternative, the flowchart of FIG. 4 may be viewed as depicting an example of steps of a method implemented in the computing device 103 (FIG. 1) according to one or more embodiments.

Beginning with box 403, the proxy server application 124 determines that an account is to be created with an authentication service 137 (FIG. 1) in order to access one or more secured resources of a network site 140 (FIG. 1). If an existing account is present, access to the specific secured resources may be denied through the particular existing account. In box 406, the proxy server application 124 determines whether the proxy account data 130 (FIG. 1) includes an existing account for the network site 140. If the proxy account data 130 does not include an existing account for the network site 140, the proxy server application 124 moves to box 409.

If the proxy account data 130 does include an existing account, the proxy server application 124 moves from box 406 to box 412 and determines whether the existing account is upgradeable in order to access the requested secured resource. If the existing account is not upgradeable, the proxy server application 124 moves from box 412 to box 409. It is noted that in some embodiments all or nearly all accounts may be capable of being upgraded and enriched with additional information when necessary. That is to say, it may be rare situation where a user already has an account with a network site 140 but has to create another account.

In box 409, the proxy server application 124 may encode a user interface 119 (FIG. 1) to obtain consent from the user to share the information needed to create an account capable of being used to access the secured resource. Such a consent may correspond to an explicit confirmation in a user interface 119, a stored consent preference, and/or other forms of consent. The user may also provide additional information. In box 415, the proxy server application 124 automatically creates an entirely new account using the set of information about the user, and potentially the newly provided information, by communicating with the account creation endpoint 138 (FIG. 1). In box 418, if the account was created successfully, the proxy server application 124 stores the resulting account information, including, for example, automatically generated security credentials, in the proxy account data 130. Thereafter, the portion of the proxy server application 124 ends.

If, instead, the proxy server application 124 determines that an existing account is upgradeable to access the secured resource, the proxy server application 124 proceeds from box 412 to box 421. In box 421, the proxy server application 124 determines a subset of the set of user information that is needed to upgrade the existing account to access the secured resource. In box 424, the proxy server application 124 encodes a user interface 119 to obtain consent from the user to share the subset of user information. The proxy server application 124 may also or instead obtain further information from the user that is not already available in the set of user information. In box 427, the proxy server application 124 upgrades the existing account by providing the additional user information, including the subset of the set of user information and/or the newly provided user information, to the account creation endpoint 138 of the network site 140. Thereafter, the portion of the proxy server application 124 ends.

Figure 5:
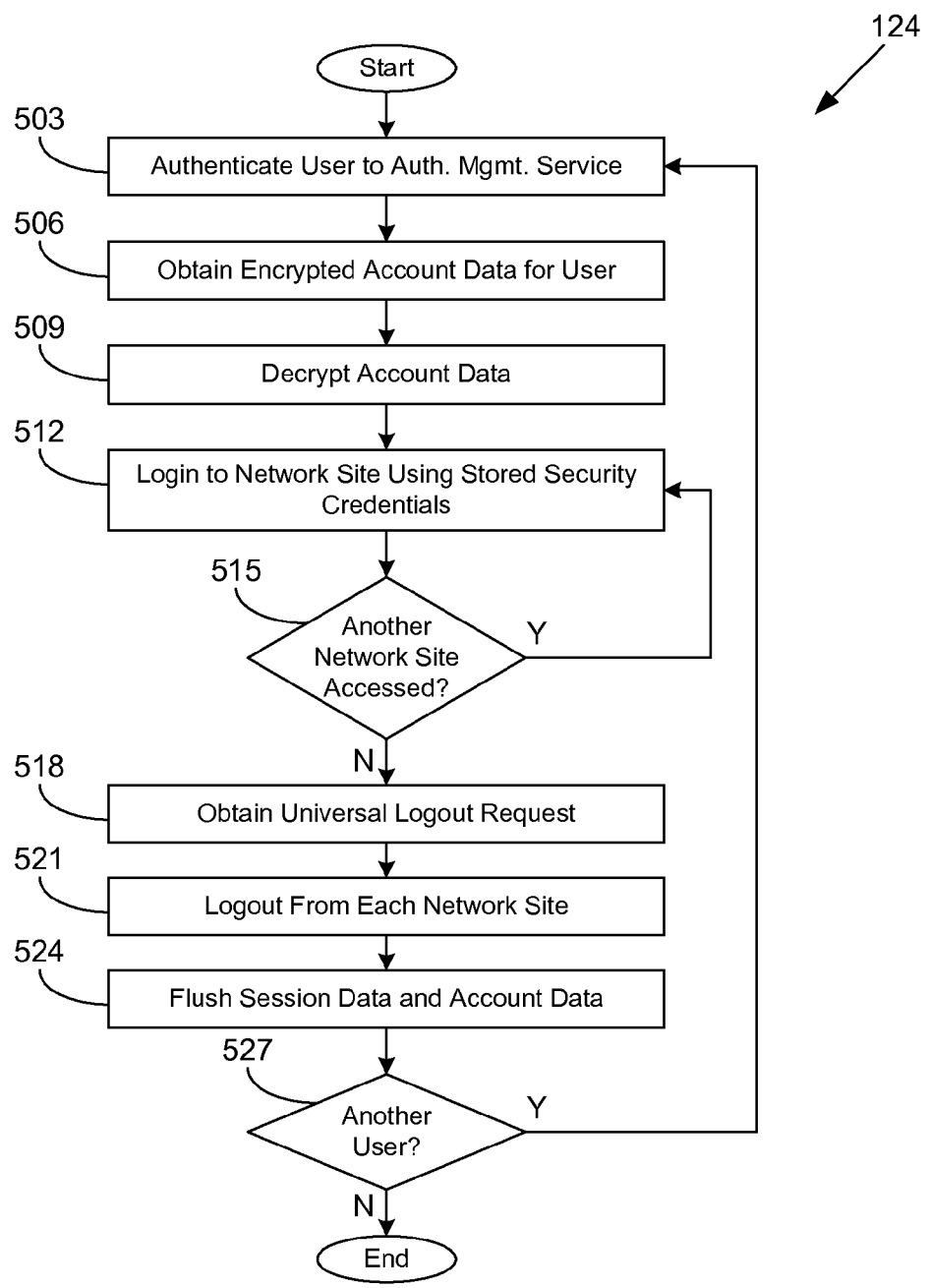

Moving on to FIG. 5, shown is a flowchart that provides one example of the operation of yet another portion of the proxy server application 124 according to various embodiments. In particular, FIG. 5 relates to multi-user use of the proxy server application 124 and logout from multiple network sites 140 (FIG. 1). It is understood that the flowchart of FIG. 5 provides merely an example of the many different types of functional arrangements that may be employed to implement the operation of the portion of the proxy server application 124 as described herein. As an alternative, the flowchart of FIG. 5 may be viewed as depicting an example of steps of a method implemented in the computing device 103 (FIG. 1) according to one or more embodiments.

Beginning with box 503, the proxy server application 124 authenticates a user with the authentication management service 163 (FIG. 1) in response to the user providing some security credential via a user interface 119 (FIG. 1) encoded by the proxy server application 124. In box 506, the proxy server application 124 obtains encrypted account data from the authentication management service 163. In box 509, the proxy server application 124 decrypts the account data based at least in part on a decryption key provided by the user. In box 512, the proxy server application 124 logs into a network site 140 by communicating with an authentication endpoint 139 (FIG. 1) of an authentication service 137 (FIG. 1).

The proxy server application 124 provides stored security credentials from the proxy account data 130 (FIG. 1). Where multiple authentication services 137 are available for a given network site 140, the user may explicitly select one of the authentication services 137, or one might be selected automatically according to a stored preference in the identity provider preference data 131 (FIG. 1). Where an account does not already exist, it may be created or upgraded automatically as previously described in connection with the flowcharts of FIGS. 3 and 4.

In box 515, the proxy server application 124 determines whether another network site 140 is accessed. Alternatively, another secured resource of the same network site 140 which requires a separate login may be accessed. If another network site 140 is accessed, the proxy server application 124 returns to box 512 and logs into the other network site 140 using stored security credentials. Thus, the proxy server application 124 may automatically authenticate with multiple authentication services 137 corresponding to multiple network sites 140. A respective session may be established for each network site 140. If another network site 140 is not accessed, the proxy server application 124 instead proceeds from box 515 to box 518.

In box 518, the proxy server application 124 obtains a universal logout request from the user. Such a logout request may be explicit, such as with the user selecting a single logout button on a user interface 119 encoded by the proxy server application 124 or a proxy client application 118 (FIG. 1), or implicit, such as with the user exiting the browser 117 (FIG. 1). The user session of the proxy server application 124 may be ended upon a switch user request being made by the user, or when the user logs out of an operating system account. In some cases, a user session with the proxy server application 124 may be ended automatically after a predefined period of inactivity. In some embodiments, the user may provide a logout request for a specific network site 140 or a set of network sites 140.

In response to the logout request, in box 521, the proxy server application 124 logs out from each network site 140. To this end, the proxy server application 124 may automatically send a respective logout indication to each of the authentication services 137. In box 524, the proxy server application 124 may automatically flush any session data and proxy account data 130. Specifically, the decrypted account data may be removed from the computing device 103. Where the logout request is a specific logout request instead of a universal logout request, the logout may be performed only for the specified network sites 140. Thus, in the case of a specific logout, the user may continue to utilize sessions that were not indicated in the specific logout request.

In box 527, the proxy server application 124 determines whether another user is to use the proxy server application 124. For example, the proxy server application 124 may be configured to accommodate multiple users on multiple clients 102 (FIG. 1). If another user is to be authenticated, the proxy server application 124 returns to box 503. Otherwise, the portion of the proxy server application 124 ends.

Figure 6A:
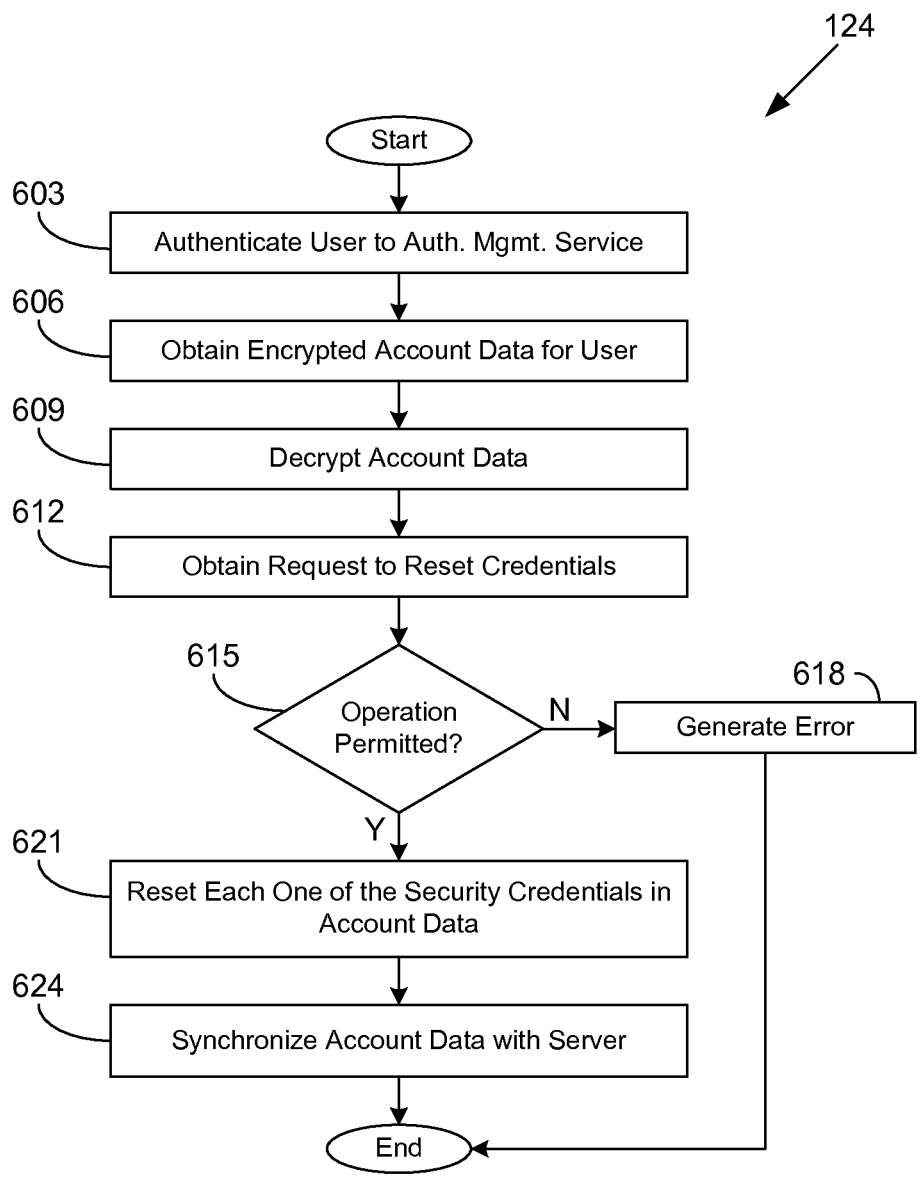

Continuing now to FIG. 6A, shown is a flowchart that provides one example of the operation of yet another portion of the proxy server application 124 according to various embodiments. In particular, FIG. 6A relates to resetting security credentials. It is understood that the flowchart of FIG. 6A provides merely an example of the many different types of functional arrangements that may be employed to implement the operation of the portion of the proxy server application 124 as described herein. As an alternative, the flowchart of FIG. 6A may be viewed as depicting an example of steps of a method implemented in the computing device 103 (FIG. 1) according to one or more embodiments.

Beginning with box 603, the proxy server application 124 authenticates a user to the authentication management service 163 (FIG. 1) in response to the user providing some security credential via a user interface 119 encoded by the proxy server application 124. In box 606, the proxy server application 124 obtains encrypted account data from the authentication management service 163. In box 609, the proxy server application 124 decrypts the account data based at least in part on a decryption key provided by the user. In box 612, the proxy server application 124 obtains a request via a user interface 119 to reset the security credentials in the proxy account data 130 (FIG. 1). Such a request may encompass a reset request, a change request, and/or a temporary change request.

In box 615, the proxy server application 124 determines whether the operation is permitted. For example, the authentication management service 163 may configure the proxy server application 124 such that only the first client 102 (FIG. 1) and/or proxy server application 124 registered for a particular authentication management account with the authentication management service 163 is permitted to perform certain operations, such as resetting the credentials and/or other operations. Other clients 102 and/or proxy server applications 124 may be preauthorized by the user as well. In some cases, the user may provide a one-time password to effect the reset or change, and the authentication management service 163 may enforce the one-time password. Also, in some cases, the proxy server application 124 may present one or more static knowledge-based questions 172 (FIG. 1) to the user to verify the identity of the user. The determination as to whether the operation is permitted may be made by the authentication management service 163.

If the operation is not permitted, the proxy server application 124 moves to box 618 and generates an error. Thereafter, the portion of the proxy server application 124 ends. Otherwise, the proxy server application 124 proceeds to box 621 and resets or changes each one of the security credentials for the accounts of the user in the proxy account data 130.

In some cases, the proxy server application 124 may establish a single temporary password in place of the automatically generated credentials. The proxy server application 124 may configure an expiration for the temporary password, where the security credentials are regenerated and reset for each of the accounts of the user after the expiration. In box 624, the proxy server application 124 synchronizes the proxy account data 130 with the server account data 166 (FIG. 1). Thereafter, the portion of the proxy server application 124 ends.

Figure 6B:
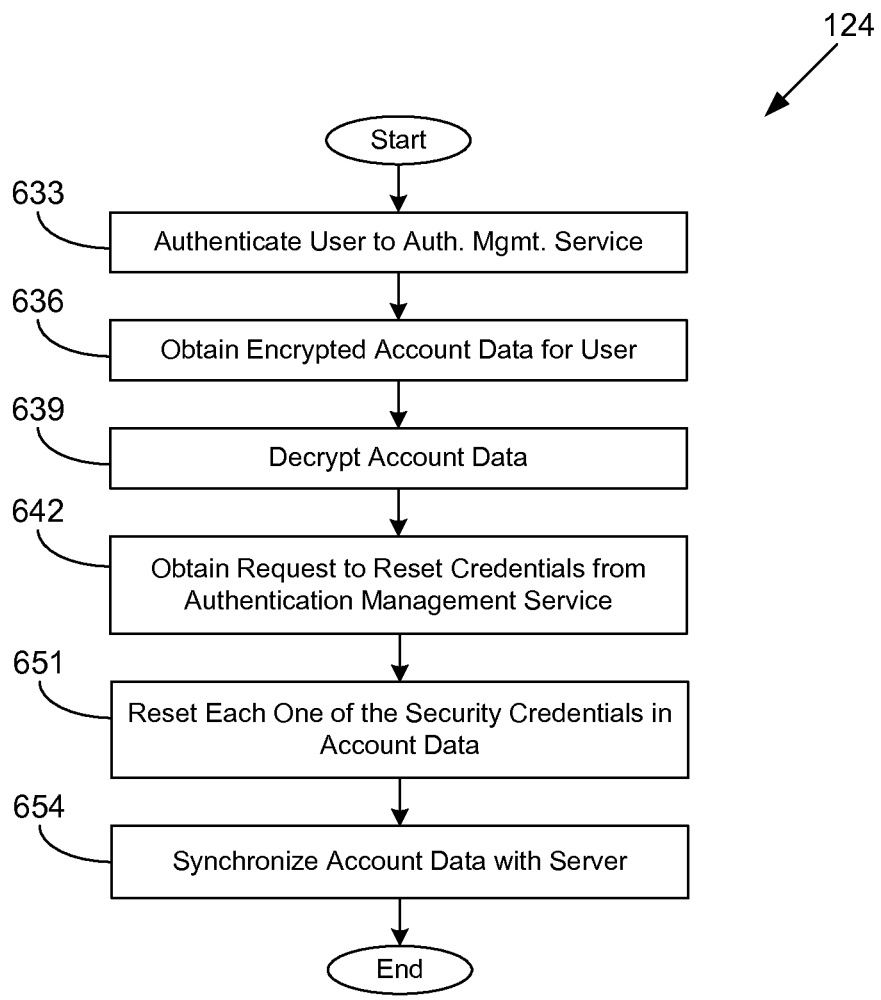

Transitioning to FIG. 6B, shown is a flowchart that provides one example of the operation of yet another portion of the proxy server application 124 according to various embodiments. In particular, FIG. 6B relates to resetting security credentials in response to a server-originated request. It is understood that the flowchart of FIG. 6B provides merely an example of the many different types of functional arrangements that may be employed to implement the operation of the portion of the proxy server application 124 as described herein. As an alternative, the flowchart of FIG. 6B may be viewed as depicting an example of steps of a method implemented in the computing device 103 (FIG. 1) according to one or more embodiments.

Beginning with box 633, the proxy server application 124 authenticates a user to the authentication management service 163 (FIG. 1) in response to the user providing some security credential. In box 636, the proxy server application 124 obtains encrypted account data from the authentication management service 163. In box 639, the proxy server application 124 decrypts the account data based at least in part on a decryption key provided by the user. In box 642, the proxy server application 124 obtains a request to reset the security credentials from the authentication management service 163. Such a request may be one-time or periodic in nature.

The proxy server application 124 proceeds to box 651 and resets or changes each one of the security credentials for the accounts of the user in the proxy account data 130. In some cases, the proxy server application 124 may establish a single temporary password in place of the automatically generated credentials. The proxy server application 124 may configure an expiration for the temporary password, where the security credentials are regenerated and reset for each of the accounts of the user after the expiration. In box 654, the proxy server application 124 synchronizes the proxy account data 130 with the server account data 166 (FIG. 1). Thereafter, the portion of the proxy server application 124 ends.

Figure 7:
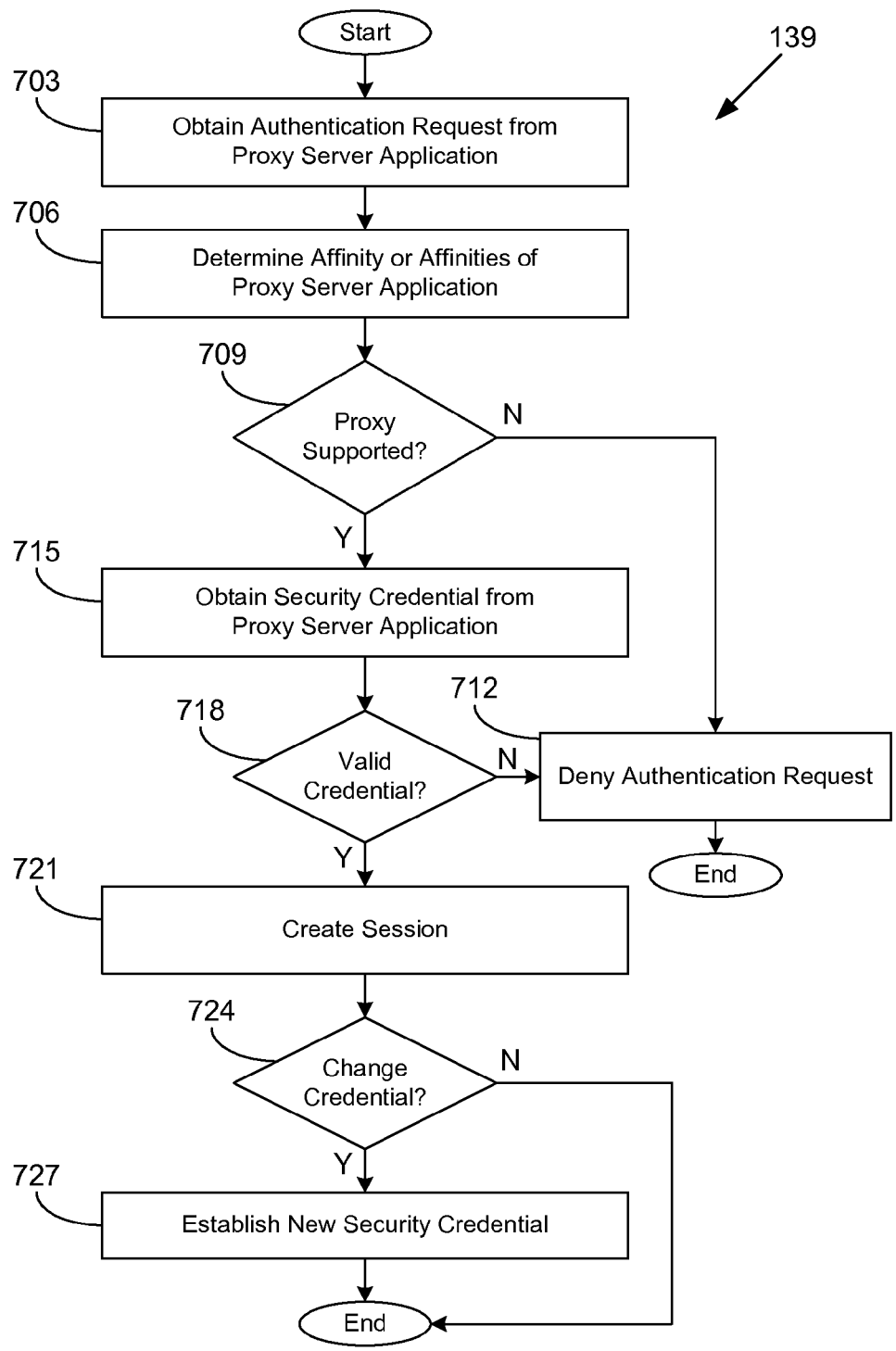
FIG. 7 is a flowchart illustrating one example of functionality implemented as portions of an authentication endpoint executed in a computing device in the networked environment of FIG. 1 according to various embodiments of the present disclosure.

Referring next to FIG. 7, shown is a flowchart that provides one example of the operation of a portion of the authentication endpoint 139 according to various embodiments. It is understood that the flowchart of FIG. 7 provides merely an example of the many different types of functional arrangements that may be employed to implement the operation of the portion of the authentication endpoint 139 as described herein. As an alternative, the flowchart of FIG. 7 may be viewed as depicting an example of steps of a method implemented in the computing device 106 (FIG. 1) according to one or more embodiments.

Beginning with box 703, the authentication endpoint 139 obtains an authentication request from a proxy server application 124 (FIG. 1). The authentication request may be obtained by way of an authentication protocol supported by multiple proxy server applications 124 having different affinities for authentication management services 163 (FIG. 1). For example, a proxy server application 124 may be distributed by a provider of an authentication management service 163, and the proxy server application 124 may have an affinity for the particular authentication management service 163. As another example, the proxy server application 124 may be distributed by a third party but may still have an affinity for a particular authentication management service 163 or a set of a plurality of authentication management services 163.

In box 706, the authentication endpoint 139 determines the affinity of proxy server application 124 from the request. For example, the authentication endpoint 139 may determine the affinity of the proxy server application 124 according to an identifier in a user agent string. It may be the case that the authentication endpoint 139 supports some proxy server applications 124 but not others. Similarly, the account creation endpoint 138 (FIG. 1) may support some proxy server applications 124 but not others.

In box 709, the authentication endpoint 139 determines whether the particular proxy server application 124 is supported. If the proxy server application 124 is not supported, the authentication endpoint 139 moves to box 712 and denies the authentication request. Thereafter, the portion of the authentication endpoint 139 ends. If the proxy server application 124 is supported, the authentication endpoint 139 moves from box 709 to box 715.

In box 715, the authentication endpoint 139 obtains a security credential from the proxy server application 124. In box 718, the authentication endpoint 139 determines whether the credential is valid. If the credential is not valid, the authentication endpoint 139 moves to box 712 and denies authentication request. Thereafter, the portion of the authentication endpoint 139 ends.

In box 721, the authentication endpoint 139 creates a session for the user in response to the successful authentication. To this end, the authentication endpoint 139 may set one or more session cookies with a session token and/or perform other actions. In addition, the authentication endpoint 139 may send branded experience data (such as, for example, logos, graphics, text, etc.) to the proxy server application 124. The proxy server application 124 may be configured to encode a user interface 119 (FIG. 1) for rendering in the client 102 (FIG. 1) for an identity provider associated with the authentication endpoint 139 based at least in part on the branded experience data. The branded experience data may include, for example, a logo for a network site 140 or identity provider, a link to a privacy policy, a link for terms of use, and/or other information.

In box 724, the authentication endpoint 139 determines whether the security credential employed by the proxy server application 124 is to be changed. Such a change may be prompted by a manual change request from the user or by expiration of a predefined change interval in the authentication endpoint 139 or in the proxy server application 124. If the security credential is to be changed, the authentication endpoint 139 moves from box 724 to box 727 and establishes the new security credential. Such a credential may be generated by the authentication endpoint 139 and sent to the proxy server application 124, or it may be generated by the proxy server application 124 and then sent to the authentication endpoint 139. Thereafter, the portion of the authentication endpoint 139 ends. If the security credential is not to be changed, the portion of the authentication endpoint 139 also ends.

Figure 8:
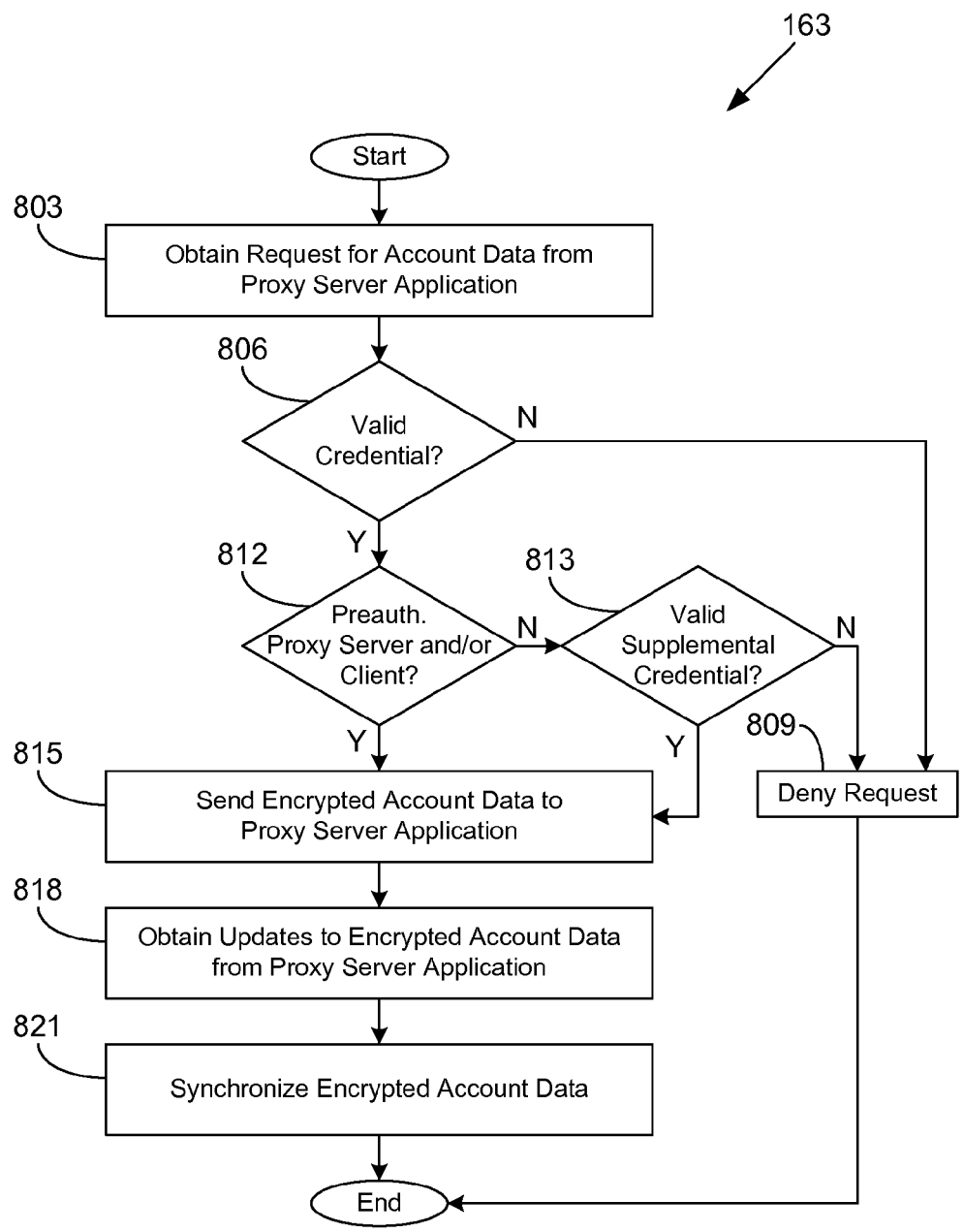
FIG. 8 is a flowchart illustrating one example of functionality implemented as portions of an authentication management service executed in a computing device in the networked environment of FIG. 1 according to various embodiments of the present disclosure.

Moving on to FIG. 8, shown is a flowchart that provides one example of the operation of a portion of the authentication management service 163 according to various embodiments. It is understood that the flowchart of FIG. 8 provides merely an example of the many different types of functional arrangements that may be employed to implement the operation of the portion of the authentication management service 163 as described herein. As an alternative, the flowchart of FIG. 8 may be viewed as depicting an example of steps of a method implemented in the computing device 112 (FIG. 1) according to one or more embodiments.

Beginning with box 803, the authentication management service 163 obtains a request for account data from a proxy server application 124 (FIG. 1) at a computing device 103 (FIG. 1). In box 806, authentication management service 163 determines whether the request includes a valid master credential 169 (FIG. 1). If the request does not include the valid master credential 169 for the user associated with the account data, the authentication management service 163 transitions to box 809 and denies the request for the account data. Thereafter, the portion of the authentication management service 163 ends.

If the request does specify a valid master credential 169, the authentication management service 163 continues from box 806 to box 812 and determines whether the proxy server application 124 corresponds to a preauthorized proxy server application 124 and/or a preauthorized client 102. For example, the authentication management service 163 may evaluate a source network address of the request, a client-identifying token presented in the request, and/or other data. If the authentication management service 163 determines that the proxy server application 124 and/or the particular client 102 are not preauthorized, the authentication management service 163 moves to box 813 and prompts the proxy server application 124 to obtain a valid supplemental credential 170 (FIG. 1), such as a one-time password, an answer to a knowledge-based question, etc. If a valid supplemental credential 170 is not provided, the authentication management service 163 moves to box 809 and denies the request for the account data. Thereafter, the portion of the authentication management service 163 ends.

If a valid supplemental credential 170 is provided, the authentication management service 163 continues from box 813 to box 815. If the proxy server application 124 is instead preauthorized, the authentication management service 163 moves from box 812 to box 815. In box 815, the authentication management service 163 sends some or all of the encrypted account data from the server account data 166 (FIG. 1) to the proxy server application 124. In box 818, the authentication management service 163 may obtain updates to the encrypted account data from the proxy server application 124. If the authentication management service 163 obtains such updates, the authentication management service 163 synchronizes the server account data 166 in box 821. Thereafter, the portion of the authentication management service 163 ends.

Figure 9:
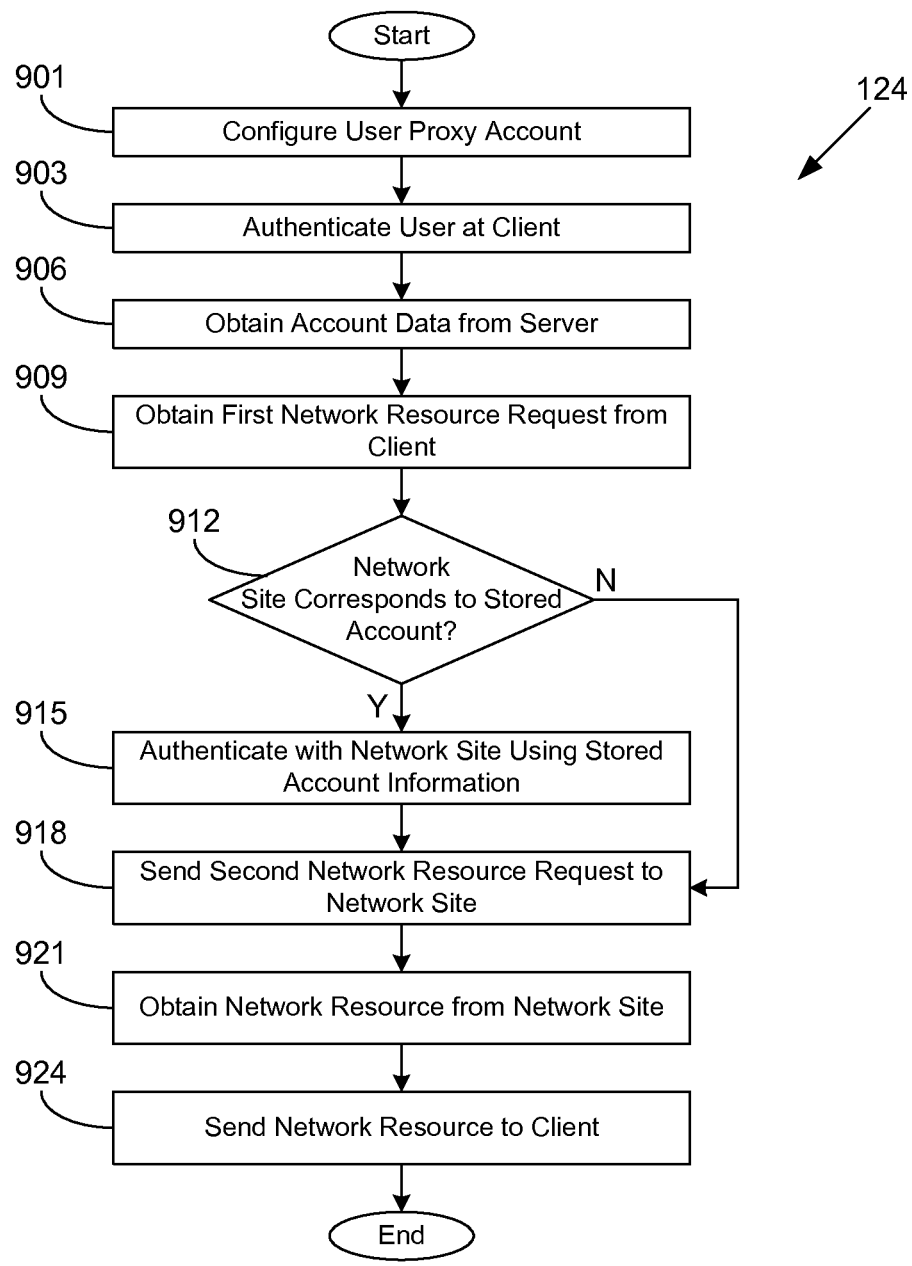
FIG. 9 is a flowchart illustrating another example of functionality implemented as portions of a proxy server application executed in a computing device in the networked environment of FIG. 1 according to various embodiments of the present disclosure.

Turning now to FIG. 9, shown is a flowchart that provides one example of the operation of a portion of the proxy server application 124 according to various embodiments. It is understood that the flowchart of FIG. 9 provides merely an example of the many different types of functional arrangements that may be employed to implement the operation of the portion of the proxy server application 124 as described herein. As an alternative, the flowchart of FIG. 9 may be viewed as depicting an example of steps of a method implemented in the computing device 103 (FIG. 1) according to one or more embodiments.

Beginning with box 901, the proxy server application 124 configures a proxy account for the user. This may be a one-time configuration task. For example, a user may configure a proxy username and password, a selected authentication management service 163 (FIG. 1), credentials for the authentication management service 163, a decryption key, and/or other configuration parameters. In box 903, the proxy server application 124 authenticates a user at a client 102 (FIG. 1). For example, the proxy server application 124 may encode a user interface 119 (FIG. 1) to obtain various security credentials and then send the data encoding the user interface 119 to the proxy server application 124 via the network 104. The network 104 may be a local network in some embodiments. The proxy server application 124 may create a session in connection with the client 102, the browser 117 (FIG. 1), and/or the proxy client application 118 (FIG. 1).

In box 906, the proxy server application 124 obtains account data from a server, e.g., the authentication management service 163, using credentials supplied by the user. To this end, the proxy server application 124 may obtain the server account data 166 (FIG. 1) and store it as the proxy account data 130 (FIG. 1). The proxy server application 124 may decrypt the account information using a decryption key provided by the user. In box 909, the proxy server application 124 obtains a first network resource request from the client 102. In box 912, the proxy server application 124 determines whether the network site 140 (FIG. 1) associated with the request corresponds to one of the accounts in the proxy account data 130. If so, the proxy server application 124 proceeds to box 915 and authenticates with the network site 140 using the stored account information. The proxy server application 124 then continues to box 918. If the network site 140 (FIG. 1) does not correspond to a stored account, the proxy server application 124 may continue from box 912 to box 918.

Alternatively, the proxy server application 124 may create a new account, upgrade an existing account, obtain account information from the user at the client 102, and/or perform other functions as previously described. Further, where the network site 140 corresponds to multiple accounts associated with the user, the proxy server application 124 may encode a user interface 119 (FIG. 1) facilitating a user selection from among the multiple accounts.

In box 918, the proxy server application 124 sends a second network resource request to the network site 140. In box 921, the proxy server application 124 obtains the network resource from the network site 140. In box 924, the proxy server application 124 sends the network resource to the client 102. Thereafter, the portion of the proxy server application 124 ends.

Figure 10:
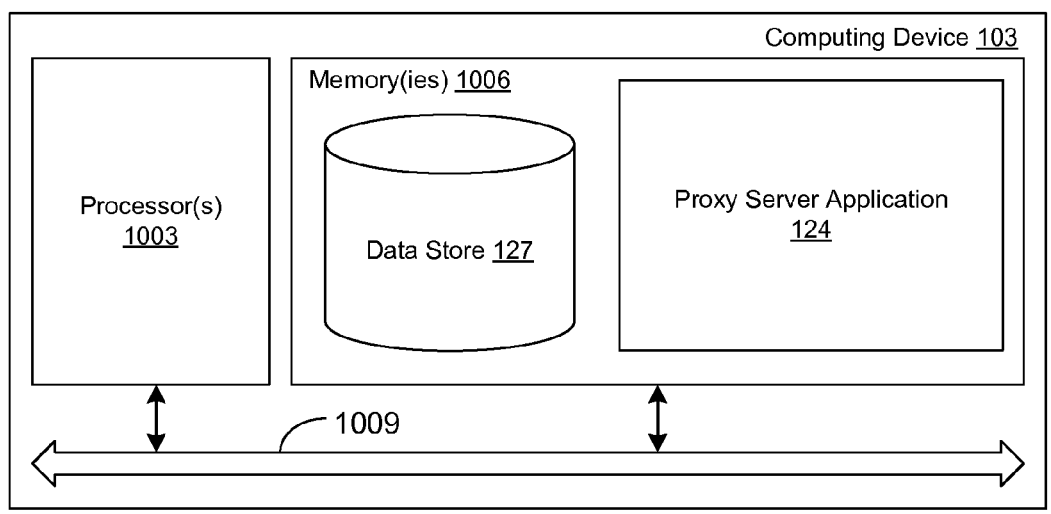
FIG. 10 is a schematic block diagram that provides one example illustration of a client employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 is the proxy server application 124 and potentially other applications. Also stored in the memory 1006 may be a data store 127 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, Java- Script®, Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the proxy server application 124 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-9 show the functionality and operation of an implementation of portions of the proxy server application 124, the authentication endpoint 139 (FIG. 1), and the authentication management service 163 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 3-9 show a specific order of execution, it is understood that the order of execution may differ from that which is depicted. For example, the order of execution of two or more blocks may be scrambled relative to the order shown. Also, two or more blocks shown in succession in FIGS. 3-9 may be executed concurrently or with partial concurrence. Further, in some embodiments, one or more of the blocks shown in FIGS. 3-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the proxy server application 124, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the Therefore, the following is claimed:

1. A non-transitory computer-readable medium embodying a proxy server application executable in a server computing device, wherein when executed the proxy server application causes the server computing device to at least:

authenticate, via the proxy server application executed in the server computing device, a user at a client computing device;

determine, via the proxy server application executed in the server computing device, in response to receiving account data for a plurality of accounts associated with the user from an external server and receiving a request from the client computing device for a network resource from a network site, whether the network site corresponds to one of the plurality of accounts;

authenticate, via the proxy server application executed in the server computing device, with the network site hosted by another external server using a security credential stored in the account data for the one of the plurality of accounts in response to determining that the network site corresponds to the one of the plurality of accounts;

request, via the proxy server application executed in the server computing device, the network resource from the network site in response to authenticating; and send, via the proxy server application executed in the server computing device, the network resource to the client computing device in response to receiving the network resource from the network site.

2. The non-transitory computer-readable medium of claim 1, wherein when executed the proxy server application further causes the server computing device to at least decrypt the account data.

3. The non-transitory computer-readable medium of claim 1, wherein when executed the proxy server application further causes the server computing device to at least purge the account data from the server computing device.

4. The non-transitory computer-readable medium of claim 1, wherein when executed the proxy server application further causes the server computing device to at least request a specific portion of the account data from the external server based at least in part on the request from the client computing device.

5. A system, comprising:

a server computing device; and a proxy server application executable in the server computing device, wherein when executed the proxy server application causes the server computing device to at least:

determine, via the server computing device, in response to receiving a first request for a secured resource on a network site from a client computing device, whether stored account information is available for the secured resource;

generate, via the server computing device, a second request for the secured resource based at least in part on the stored account information in response to determining that the stored account information is available for the secured resource;

send the second request from the server computing device to an external server corresponding to the network site; and send the secured resource from the server computing device to the client computing device logic that, in response to receiving the secured resource from the external server.

6. The system of claim 5, wherein when executed the proxy server application further causes the server computing device to at least:

generate, via the server computing device, data encoding a user interface that facilitates selection from among a plurality of accounts described in the stored account information;

send the data encoding the user interface from the server computing device to the client computing device; and wherein generating the second request further comprises employing a security credential associated with one of the plurality of accounts according to a selection of the one of the plurality of accounts from the client computing device in generating the second request.

7. The system of claim 5, wherein when executed the proxy server application further causes the server computing device to at least:

generate, via the server computing device, data encoding a user interface that facilitates selection from among a plurality of authentication management providers;

send, via the server computing device, the data encoding the user interface to the client computing device; and request, via the server computing device, the stored account information from one of the plurality of authentication management providers in response to receiving a selection of the one of the plurality of authentication management providers from the client computing device.

8. The system of claim 5, wherein determining whether stored account information is available for the secured resource further comprises:

determining, via the server computing device, whether any of a plurality of accounts represented in the stored account information is capable of being used to access the secured resource; and creating, via the server computing device, a new account with the network site in response to determining that the plurality of accounts are not capable of being used to access the secured resource, wherein a set of information about a user associated with the client computing device is automatically provided to the network site to create the new account.

9. The system of claim 8, wherein creating the new account further comprises automatically generating a security credential for the new account according to a security credential specification.

10. The system of claim 5, wherein determining whether stored account information is available for the secured resource further comprises:

determining, via the server computing device, whether any of a plurality of accounts represented in the stored account information is capable of being used to access the secured resource; and upgrading, via the server computing device, one of the plurality of accounts in response to determining that the plurality of accounts are not capable of being used to access the secured resource, wherein a set of information about a user at the client computing device is automatically provided to the network site to upgrade the one of the plurality of accounts.

11. The system of claim 5, wherein when executed the proxy server application further causes the server computing device to at least:
- send, via the server computing device, a third request for the secured resource to the external server corresponding to the network site in response to receiving the first request;
- determine, via the server computing device, in response to receiving data encoding a network page from the external server responsive to the third request, an authentication parameter type requested by a form in the network page based at least in part on metadata included in the data encoding the network page; and
- wherein the second request is generated based at least in part on the authentication parameter type.

12. The system of claim 5, wherein the first request is received from the client computing device via a local network.

13. The system of claim 5, wherein when executed the proxy server application further causes the server computing device to at least:
- authenticate the server computing device with an authentication management service; and
- request, via the server computing device, the stored account information from the authentication management service.

14. The system of claim 5, wherein when executed the proxy server application further causes the server computing device to at least:
- authenticate the server computing device with an authentication management service using an authentication management security credential in response to receiving the authentication management security credential from the client computing device; and
- receive, via the server computing device, the stored account information from the authentication management service.

15. The system of claim 5, wherein when executed the proxy server application further causes the server computing device to at least, in response to receiving a decryption key from the client computing device, decrypt, via the server computing device, the stored account information using the decryption key.

16. A method, comprising:
- receiving, via a proxy server application executed in a server computing device, a first network resource request from a client computing device;
- determining, via the proxy server application executed in the server computing device, whether a network resource corresponding to the first network resource request is associated with stored account information;
- authenticating, via the proxy server application executed in the server computing device, with a network site using the stored account information;
- sending, via the proxy server application executed in the server computing device, a second network resource request for the network resource to the network site;
- receiving, via the proxy server application executed in the server computing device, the network resource from the network site; and
- sending, via the proxy server application executed in the server computing device, the network resource to the client computing device.

17. The method of claim 16, further comprising:
- generating, via the proxy server application executed in the server computing device, data encoding a user interface that facilitates selection from among a plurality of accounts in the stored account information;
- sending, via the proxy server application executed in the server computing device, the data encoding the user interface to the client computing device;
- receiving, via the proxy server application executed in the server computing device, a user selection of one of the plurality of accounts; and
- wherein authenticating further comprises authenticating, via the proxy server application, the server computing device with the network site using the one of the plurality of accounts according to the user selection.

18. The method of claim 16, wherein the first network resource request comprises a proxy request for the network resource, and the second network resource request comprises a direct request for the network resource.

19. The method of claim 16, further comprising:
- establishing, via the proxy server application executed in the server computing device, a session with the network site;
- determining, via the proxy server application executed in the server computing device, that a logout from the network site is to be performed; and
- performing, via the proxy server application executed in the server computing device, the logout by ending the session associated with the network site.

20. The method of claim 16, further comprising:
- authenticating, via the proxy server application executed in the server computing device, a user at the client computing device; and
- requesting, via the proxy server application executed in the server computing device, the stored account information from at least one external server in response to authenticating the user, the stored account information being associated with the user.

21. The method of claim 20, wherein the stored account information includes a respective security credential for individual ones of a plurality of network site accounts associated with the user.

22. The method of claim 21, further comprising determining, via the proxy server application executed in the server computing device, one of the plurality of network site accounts according to a domain name of the network site, the respective security credential of the one of the plurality of network site accounts being employed to authenticate the server computing device with the network site.

23. The method of claim 21, further comprising automatically resetting, via the proxy server application executed in the server computing device, individual ones of the respective security credentials to a respective new security credential.

* * * * *